(12) United States Patent
Song et al.

(10) Patent No.: US 12,477,528 B2
(45) Date of Patent: Nov. 18, 2025

(54) METHOD AND DEVICE FOR RECEIVING DATA IN WIRELESS LAN SYSTEM

(71) Applicant: LG ELECTRONICS INC., Seoul (KR)

(72) Inventors: Taewon Song, Seoul (KR); Suhwook Kim, Seoul (KR); Jeongki Kim, Seoul (KR); Kiseon Ryu, Seoul (KR); Insun Jang, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 882 days.

(21) Appl. No.: 17/275,028

(22) PCT Filed: Sep. 18, 2019

(86) PCT No.: PCT/KR2019/012026
§ 371 (c)(1),
(2) Date: Mar. 10, 2021

(87) PCT Pub. No.: WO2020/060169
PCT Pub. Date: Mar. 26, 2020

(65) Prior Publication Data
US 2022/0061051 A1 Feb. 24, 2022

Related U.S. Application Data

(60) Provisional application No. 62/733,092, filed on Sep. 19, 2018.

(51) Int. Cl.
*H04W 72/0453* (2023.01)
*H04W 84/12* (2009.01)

(52) U.S. Cl.
CPC ........ *H04W 72/0453* (2013.01); *H04W 84/12* (2013.01)

(58) Field of Classification Search
CPC . H04W 72/0453; H04W 72/51; H04W 84/12; H04W 88/10
See application file for complete search history.

(56) References Cited

U.S. PATENT DOCUMENTS

| 2012/0300759 A1 | 11/2012 | Patanapongpibul et al. |
| 2014/0192777 A1 | 7/2014 | Seok |

(Continued)

OTHER PUBLICATIONS

PCT International Application No. PCT/KR2019/012026, International Search Report dated Dec. 20, 2019, 4 pages.

(Continued)

*Primary Examiner* — Khoa Huynh
(74) *Attorney, Agent, or Firm* — LEE, HONG, DEGERMAN, KANG & WAIMEY

(57) ABSTRACT

Provided are a method and device for receiving data in a wireless LAN system. Particularly, an STA transmits an operating band negotiation request frame to an AP by means of a first band supported by first and second RFs. The STA receives an operating band negotiation response frame from the AP by means of the first band as a response to the operating band negotiation request frame. The STA changes the first band supported by the second RF into a second band on the basis of the operating band negotiation request frame and the operating band negotiation response frame. The STA receives first data from the AP by means of the first band supported by the first RF and the second band supported by the second RF. The first data is transmitted by means of a multi-band in which the first band and the second band are combined.

15 Claims, 31 Drawing Sheets

(56) References Cited

U.S. PATENT DOCUMENTS

| | | | |
|---|---|---|---|
| 2015/0063105 A1* | 3/2015 | Liu | H04L 47/26 |
| | | | 370/252 |
| 2015/0288599 A1 | 10/2015 | Zhou et al. | |
| 2018/0054847 A1* | 2/2018 | Cariou | H04W 28/0861 |
| 2019/0082373 A1* | 3/2019 | Patil | H04L 1/1614 |

OTHER PUBLICATIONS

Asterjadhi, et al., "802.11ax operation in 6GHz band," IEEE 11-18-1256-00-00ax, Jul. 2018, 10 pages.

* cited by examiner

FIG. 1
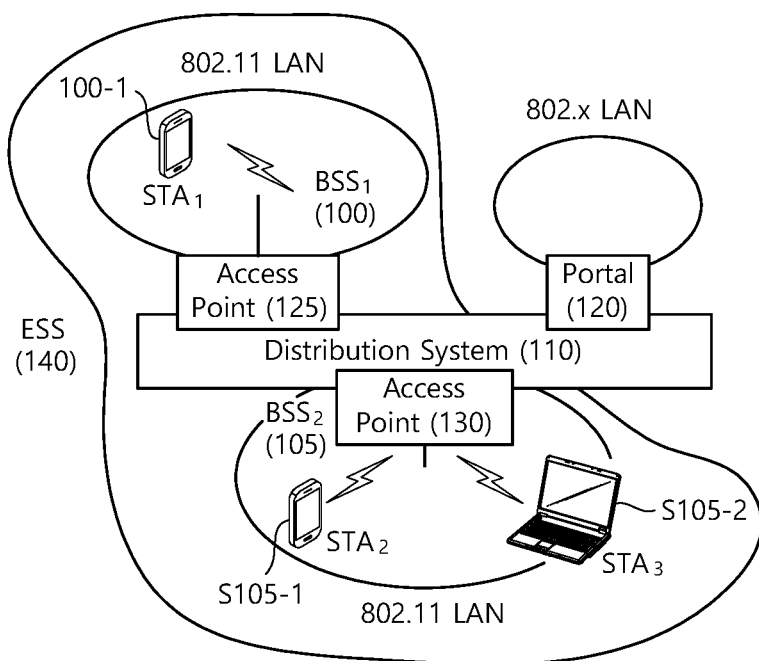
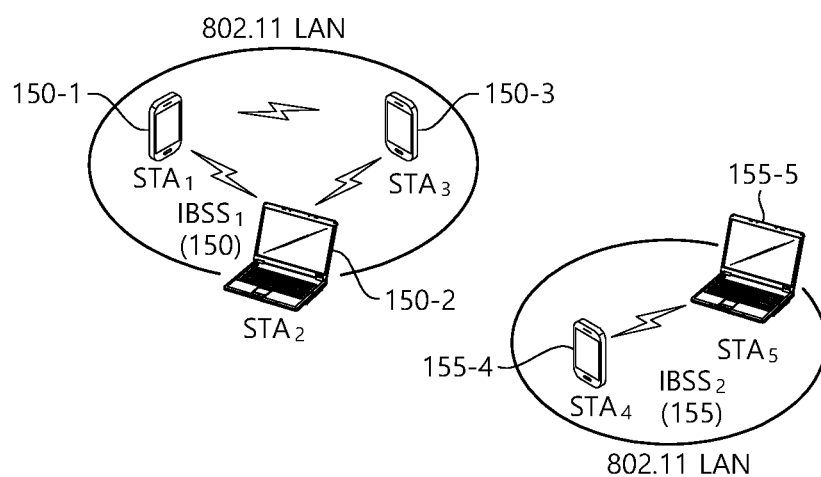

METHOD AND DEVICE FOR RECEIVING DATA IN WIRELESS LAN SYSTEM

CROSS-REFERENCE TO RELATED APPLICATIONS

This application is the National Stage filing under 35 U.S.C. 371 of International Application No. PCT/KR2019/012026, filed on Sep. 18, 2019, which claims the benefit of U.S. Provisional Application No. 62/733,092, filed on Sep. 19, 2018, the contents of which is incorporated by reference herein in its entirety.

BACKGROUND

Field

The present disclosure relates to a technique for receiving data in a wireless local area network (WLAN) system and, more particularly, to a method and a device for transmitting data through a multi-band by changing at least one antenna or RF chain to a different band in a WLAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY

The present disclosure proposes a method and a device for receiving data in a wireless local area network (WLAN) system.

An embodiment of the present disclosure proposes a method for receiving data.

The embodiment may be performed in a network environment supporting a next-generation WLAN system. The next-generation WLAN system may be a WLAN system evolving from an 802.11ax system and may satisfy backward compatibility with the 802.11ax system. The next-generation WLAN system may correspond to an extremely high throughput (EHT) WLAN system or an 802.11be WLAN system.

The embodiment proposes a method for transmitting data through a multi-band by changing at least one antenna or RF chain to a different band in a next-generation WLAN, such as an EHT WLAN system.

The embodiment may be performed by a station (STA), and the STA may correspond to a STA supporting an EHT WLAN system. An access point (AP) of the embodiment and the STA may support a multi-band (or multi-link).

The STA transmits an operating band negotiation request frame to the AP through a first band supported by first and second radio frequencies (RFs).

The STA receives an operating band negotiation response frame from the AP through the first band in response to the operating band negotiation request frame.

The STA changes the first band supported by the second RF to a second band based on the operating band negotiation request frame and the operating band negotiation response frame.

That is, the STA may notify the AP that the STA desires to change a band supported by at least one RF through the operating band negotiation request frame. The AP may notify the STA that the band supported by the at least one RF can be changed through the operating band negotiation response frame. Accordingly, the STA can change the band supported by the specific RF through an operating band negotiation process with the AP.

In this embodiment, it is assumed that the STA and the AP have the first and second RFs. Since the first and second RFs support the first band before the operating band negotiation process is performed, the STA and the AP can transmit data only through the first band. However, after the operating band negotiation request frame and the operating band negotiation response frame are exchanged, the first RF still supports the first band, while the second RF supports the second band changed from the first band.

In the next-generation WLAN system, the first and second RFs can change a band and may thus be referred to as switchable RFs. That is, a band supported by the first RF may also be changed after the operating band negotiation process is performed. However, the embodiment is limited to a case where only a band supported by the second RF is changed.

The STA receives first data from the AP through the first band supported by the first RF and the second band supported by the second RF. Here, the first data is transmitted through a multi-band into which the first band and the second band aggregated. That is, the AP may update information on the STA, and the STA may change a band for the second RF based on the updated information and may then receive the data through the multi-band.

The first band includes a first primary channel, and the second band includes a second primary channel.

When the multi-band includes only the two bands which are aggregated, the first band may be a 2.4 GHz or 5 GHz band, and the second band may be a 6 GHz band. When the multi-band further include a third band, the first band may be a 2.4 GHz band, the second band may be a 5 GHz band, and the third band may be a 6 GHz band. The foregoing configurations of the bands are provided only for illustration, and the WLAN system may support various numbers of bands and channels.

According to an embodiment proposed in the present disclosure, an antenna or RF chain to establish a multi-band may be configured, thereby solving a spatial constraint of a device and enabling efficient data transmission through the multi-band.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
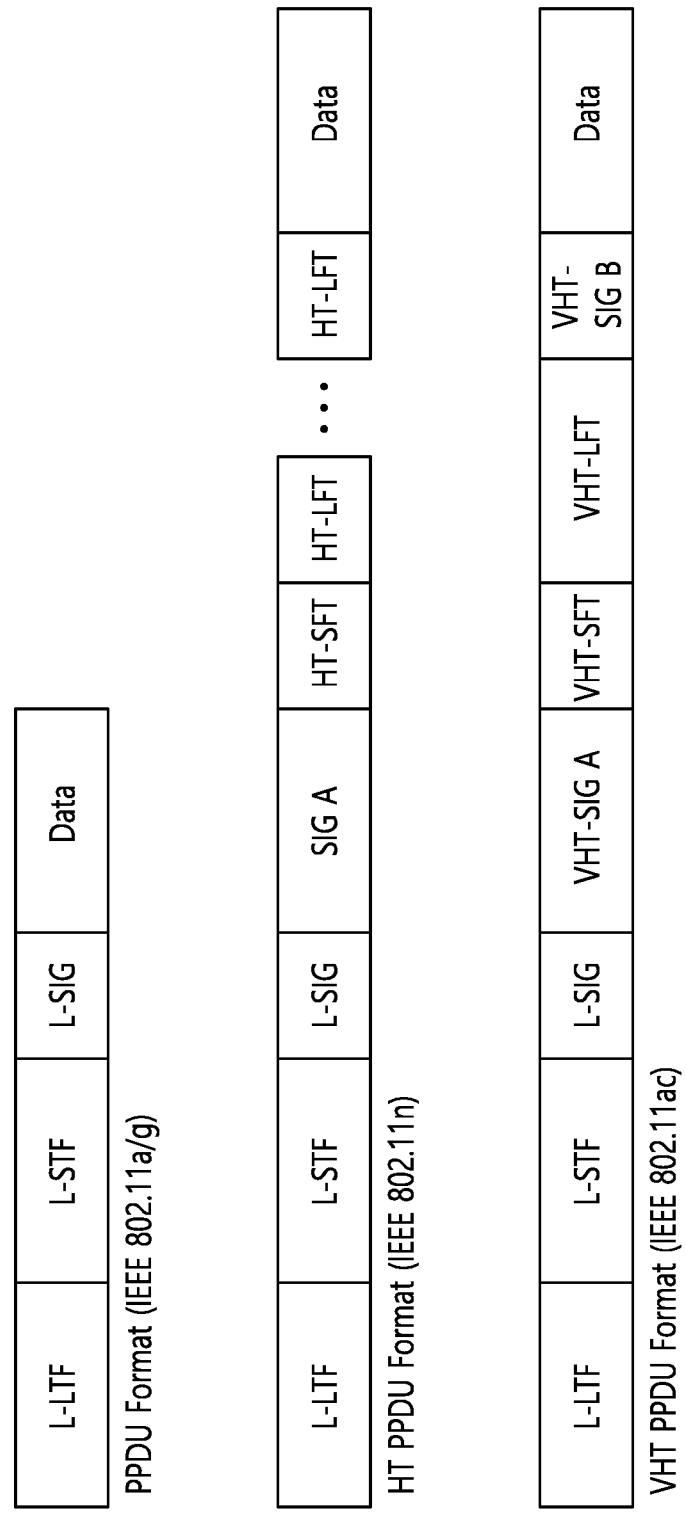
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs (100, 105) (hereinafter, referred to as BSS). The BSSs (100, 105), as a set of an AP and an STA such as an access point (AP) (125) and a station (STA1) (100-1) which are successfully synchronized to communicate with each other, are not concepts indicating a specific region. The BSS (105) may include one or more STAs (105-1, 105-2) which may be joined to one AP (130).

The BSS may include at least one STA, APs providing a distribution service, and a distribution system (DS) (110) connecting multiple APs.

The distribution system (110) may implement an extended service set (ESS) (140) extended by connecting the multiple BSSs (100, 105). The ESS (140) may be used as a term indicating one network configured by connecting one or more APs (125, 130) through the distribution system (110). The AP included in one ESS (140) may have the same service set identification (SSID).

A portal (120) may serve as a bridge which connects the wireless LAN network (IEEE 802.11) and another network (e.g., 802.X).

In the BSS illustrated in the upper part of FIG. 1, a network between the APs (125, 130) and a network between the APs (125, 130) and the STAs (100-1, 105-1, 105-2) may be implemented. However, the network is configured even between the STAs without the APs (125, 130) to perform communication. A network in which the communication is performed by configuring the network even between the STAs without the APs (125, 130) is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs (150-1, 150-2, 150-3, 155-4, 155-5) are managed by a distributed manner. In the IBSS, all STAs (150-1, 150-2, 150-3, 155-4, 155-5) may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in various meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, and so on. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
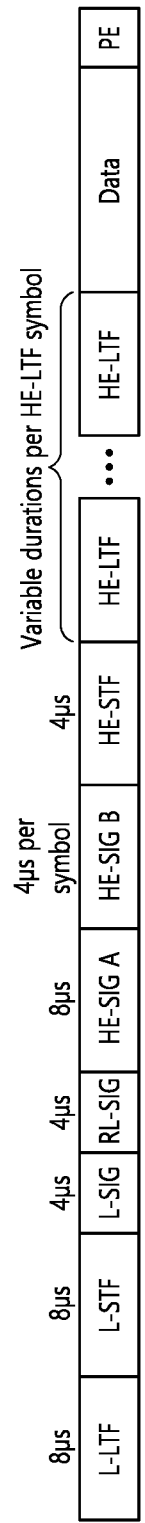
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
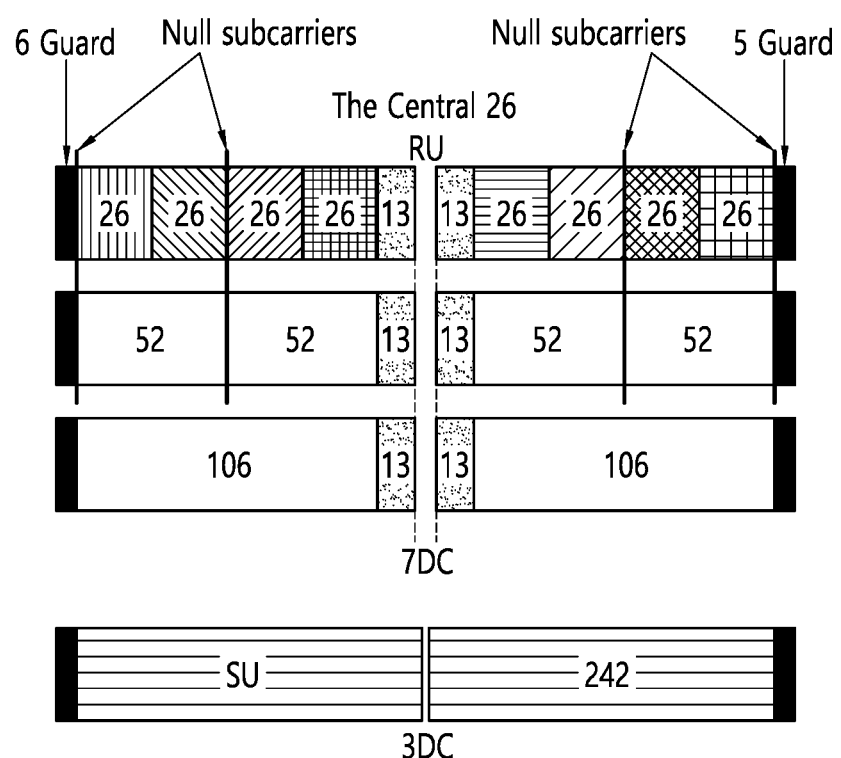
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and, in this case, as illustrated in a lowermost part of FIG. 4, one 242-unit may be used and, in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
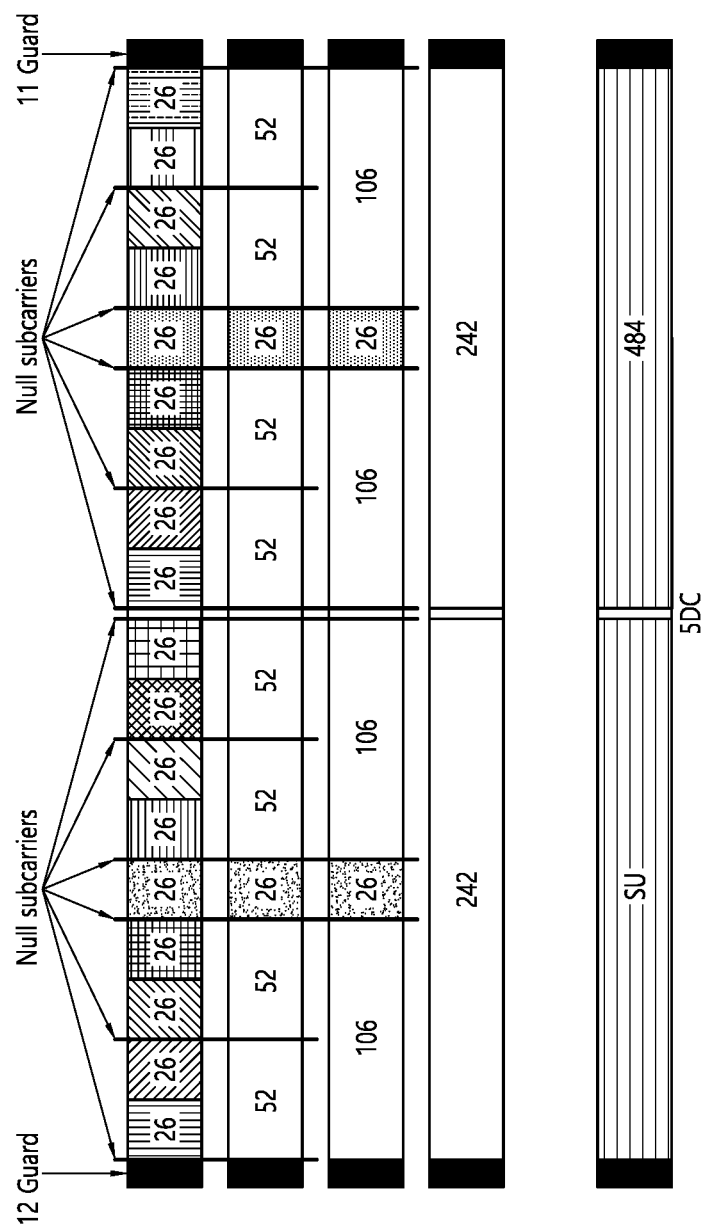
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like, may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
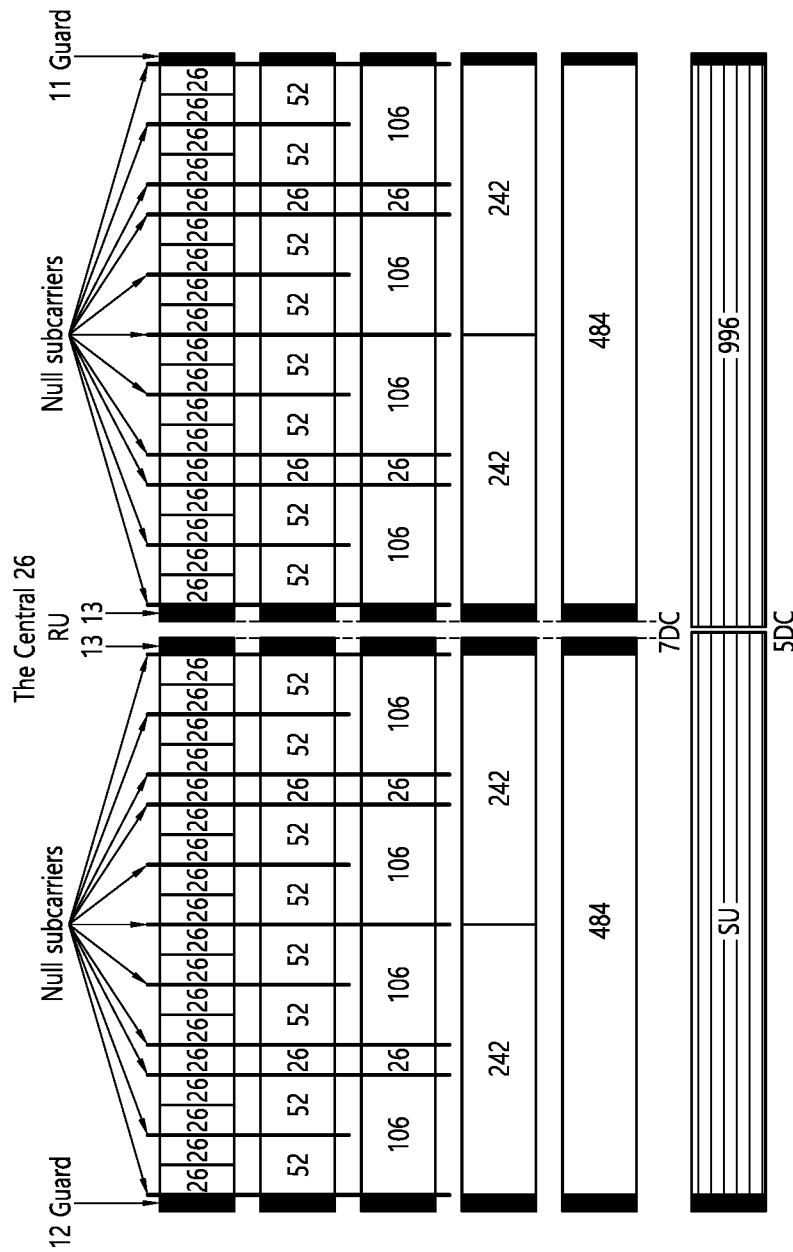
FIG. 6 is a diagram illustrating a layout of resource units (RUs) used in a band of 80 MHz.

FIG. 6 is a diagram illustrating a layout of resource units (RUS) used in a band of 80 MHz.

Figure 26:
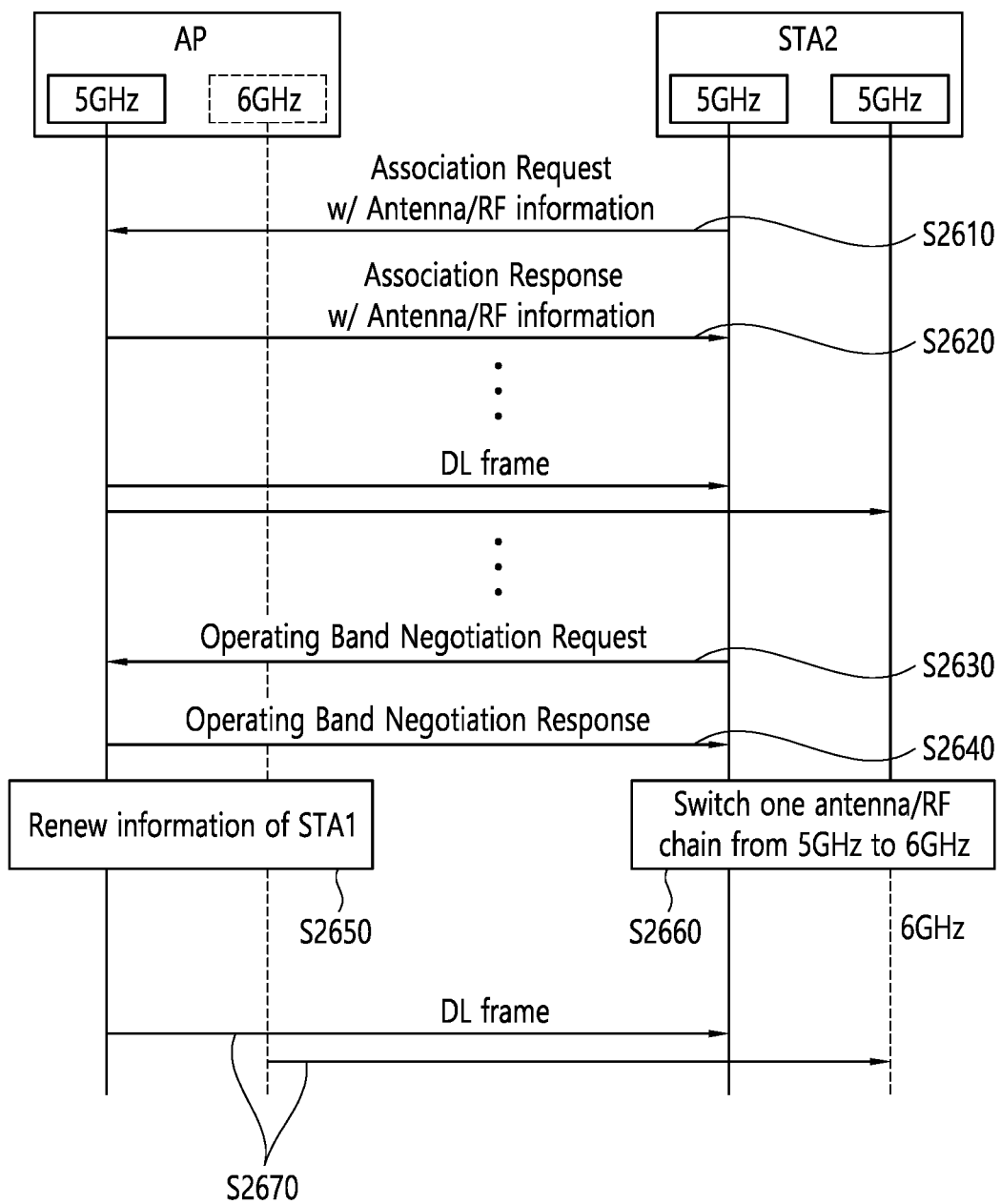
FIG. 26 is a flowchart illustrating another example of an operating band switching procedure.

Similarly to a case in which the RUs having various RUs are used in one example of each of FIG. 4 or 5, 26-RU, 52-RU, 106-RU, 242-RU, 484-RU, and the like, may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band. Moreover, as illustrated in FIG. 6, when the RU layout is used for the single user, 996-RU may be used and, in this case, 5 DC tones may be inserted.

Meanwhile, the detailed number of RUs may be modified similarly to one example of each of FIG. 4 or FIG. 5.

Figure 7:
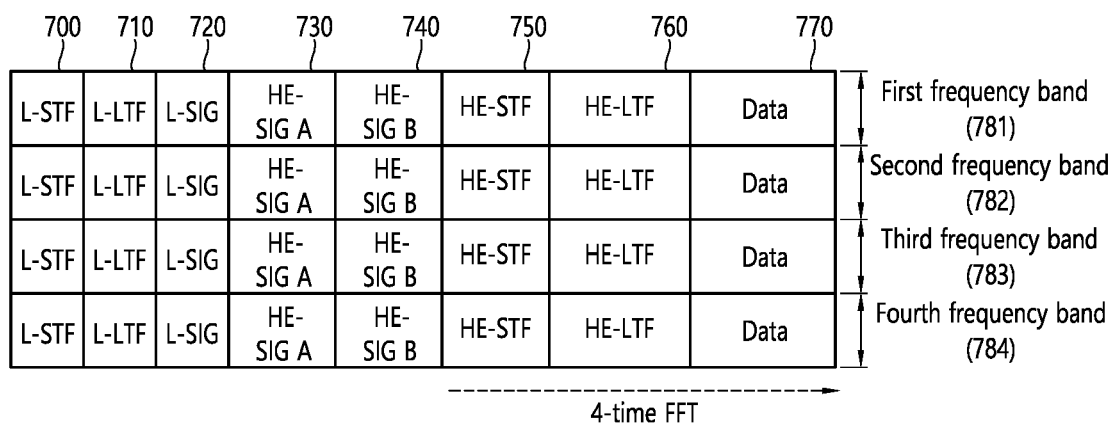
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF (700) may include a short training orthogonal frequency division multiplexing (OFDM) symbol. The L-STF (700) may be used for frame detection, automatic gain control (AGC), diversity detection, and coarse frequency/time synchronization.

An L-LTF (710) may include a long training orthogonal frequency division multiplexing (OFDM) symbol. The L-LTF (710) may be used for fine frequency/time synchronization and channel prediction.

An L-SIG (720) may be used for transmitting control information. The L-SIG (720) may include information regarding a data rate and a data length. Further, the L-SIG (720) may be repeatedly transmitted. That is, a new format, in which the L-SIG (720) is repeated (for example, may be referred to as R-LSIG) may be configured.

An HE-SIG-A (730) may include the control information common to the receiving station.

In detail, the HE-SIG-A (730) may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), and 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A (730) may be composed of two parts: HE-SIG-A1 and HE-SIG-A2. HE-SIG-A1 and HE-SIG-A2 included in the HE-SIG-A may be defined by the following format structure (fields) according to the PPDU.

An HE-SIG-B (740) may be included only in the case of the PPDU for the multiple users (MUS). Principally, an HE-SIG-A (750) or an HE-SIG-B (760) may include resource allocation information (alternatively, virtual resource allocation information) for at least one receiving STA.

Figure 8:
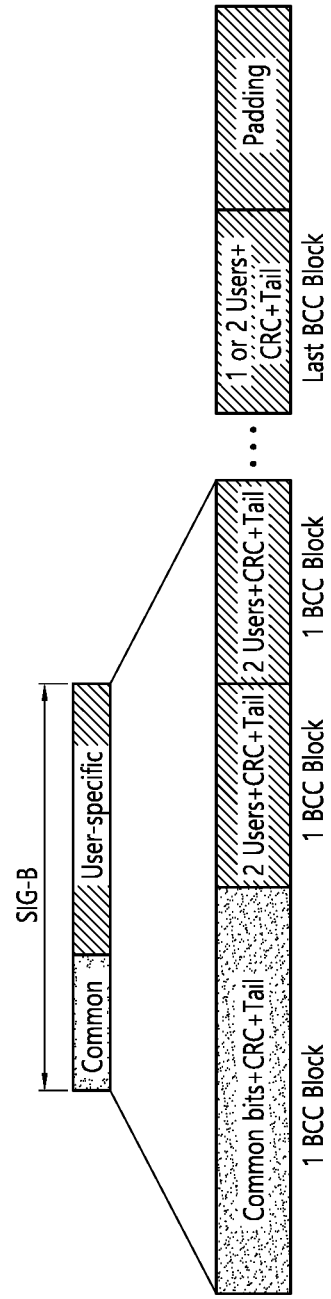
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B (740) may be transmitted in a duplicated form on a MU PPDU. In the case of the HE-SIG-B (740), the HE-SIG-B (740) transmitted in some frequency band (e. g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B (740) in a specific frequency band (e.g., the second frequency band) is duplicated with the HE-SIG-B (740) of another frequency band (e.g., the fourth frequency band). Alternatively, the HE-SIG B (740) may be transmitted in an encoded form on all transmission resources. A field after the HE-SIG B (740) may include individual information for respective receiving STAs receiving the PPDU.

The HE-STF (750) may be used for improving automatic gain control estimation in a multiple input multiple output (MIMO) environment or an OFDMA environment.

The HE-LTF (760) may be used for estimating a channel in the MIMO environment or the OFDMA environment.

The size of fast Fourier transform (FFT)/inverse fast Fourier transform (IFFT) applied to the HE-STF (750) and the field after the HE-STF (750), and the size of the FFT/IFFT applied to the field before the HE-STF (750) may be different from each other. For example, the size of the FFT/IFFT applied to the HE-STF (750) and the field after the HE-STF (750) may be four times larger than the size of the FFT/IFF T applied to the field before the HE-STF (750).

For example, when at least one field of the L-STF (700), the L-LTF (710), the L-SIG (720), the HE-SIG-A (730), and the HE-SIG-B (740) on the PPDU of FIG. 7 is referred to as a first field, at least one of the data field (770), the HE-STF (750), and the HE-LTF (760) may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 F FT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (G1) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A (730) and may be instructed to receive the downlink PPDU based on the HE-SIG-A (730). In this case, the STA may perform decoding based on the FFT size changed from the HE-STF (750) and the field after HE-STF (750). On the contrary, when the STA may not be instructed to receive the downlink PPDU based on the HE-SIG-A (730), the STA may stop the decoding and configure a network allocation vector (NAV). A cyclic prefix (CP) of the HE-STF (750) may have a larger size than the CP of another field and the during the CP period, the STA may perform the decoding for the downlink PPDU by changing the FFT size.

Hereinafter, in the embodiment of the present disclosure, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, subchannels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, subchannel) allocated for the DL MU OF DMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, subchannels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, subchannel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
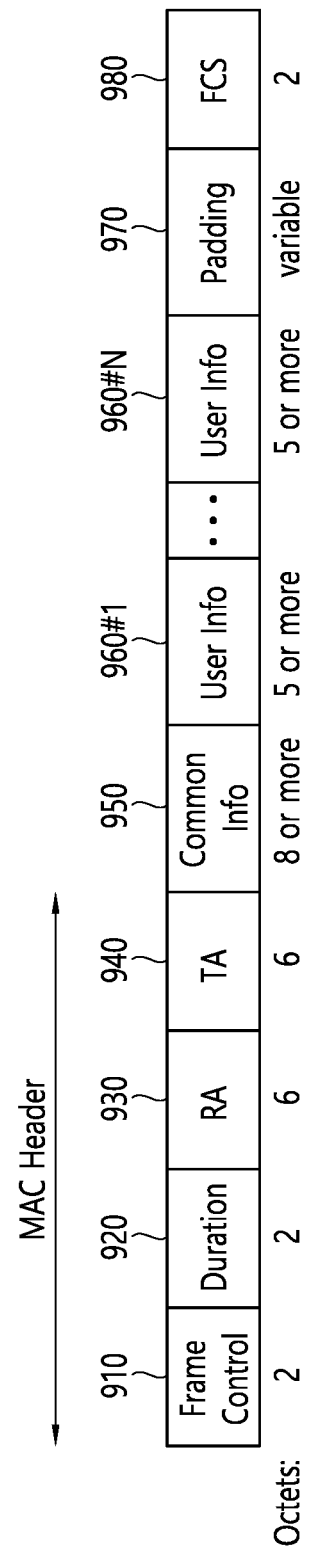
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field (910) shown in FIG. 9 may include information related to a version of the MAC protocol and other additional control information, and a Duration field (920) may include time information for configuring a NAV or information related to an identifier (e.g., AID) of the user equipment.

Also, the RA field (930) includes address information of a receiving STA of the corresponding trigger frame and may be omitted if necessary. The TA field (940) includes address information of an STA triggering the corresponding trigger frame (for example, an AP), and the common information field (950) includes common control information applied to a receiving STA that receives the corresponding trigger frame. For example, a field indicating the length of the L-SIG field of the UL PPDU transmitted in response to the corresponding trigger frame or information controlling the content of the SIG-A field (namely, the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960#1 to 960#N) corresponding to the number of receiving STAs that receive the trigger frame of FIG. 9. The per user information field may be referred to as an "RU allocation field".

Also, the trigger frame of FIG. 9 may include a padding field (970) and a frame check sequence field (980).

It is preferable that each of the per user information fields (960#1 to 960#N) shown in FIG. 9 includes a plurality of subfields.

Figure 10:
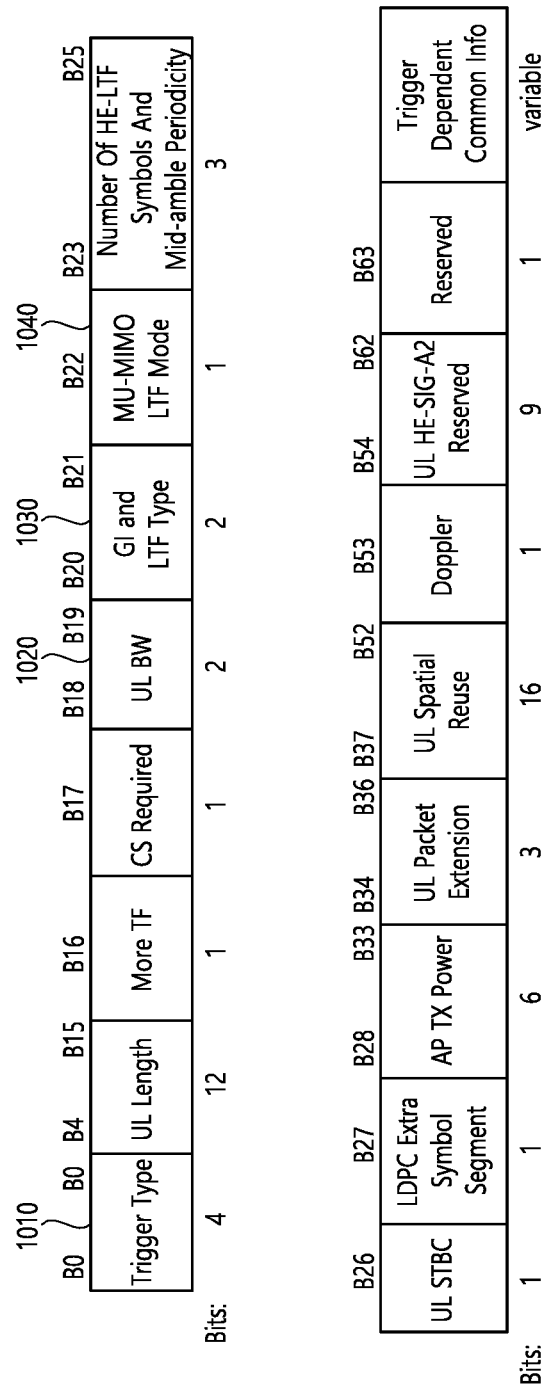
FIG. 10 illustrates an example of a common information field.

FIG. 10 illustrates an example of a common information field. Among the subfields of FIG. 10, some may be omitted, and other additional subfields may also be added. Additionally, the length of each of the subfields shown in the drawing may be varied.

The trigger type field (1010) of FIG. 10 may indicate a trigger frame variant and encoding of the trigger frame variant.

The UL BW field (1020) of FIG. 10 indicates bandwidth in the HE-SIG-A field of an HE Trigger Based (TB) PPDU.

The Guard Interval (GI) and LTF type fields (1030) of FIG. 10 indicate the GI and HE-LTF type of the HE TB PPDU response.

Also, when the GI and LTF type fields (1030) have a value of 2 or 3, the MU-MIMO LTF mode field (1040) of FIG. 10 indicates the LTF mode of a UL MU-MIMO HE TB PPDU response.

If the trigger frame allocates an RU that occupies the whole HE TB PPDU bandwidth and the RU is allocated to one or more STAs, the MU-MIMO LTF mode field (1040) indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field (1040) indicates the HE single stream pilot HE-LTF mode.

Figure 11:
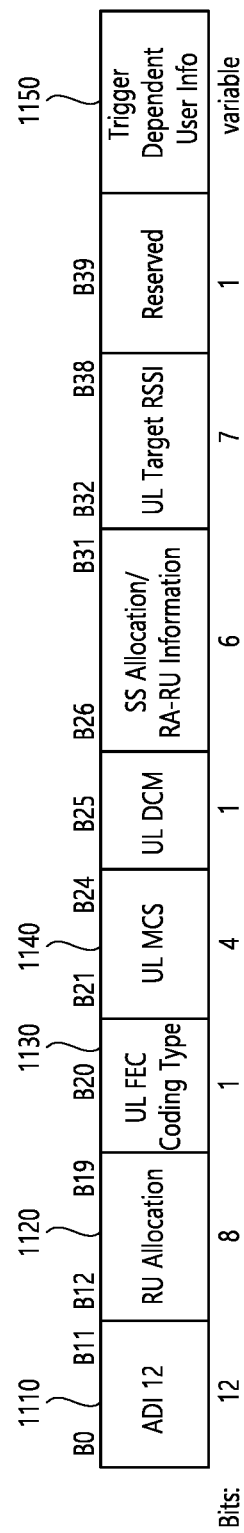
FIG. 11 illustrates an example of a subfield being included in a per user information field.

FIG. 11 illustrates an example of a subfield being included in a per user information field. Among the subfields of FIG. 11, some may be omitted, and other additional subfields may also be added. Additionally, the length of each of the subfields shown in the drawing may be varied.

The User Identifier field of FIG. 11 (or AID12 field, 1110) indicates the identifier of an STA (namely, a receiving STA) corresponding to per user information, where an example of the identifier may be the whole or part of the AID.

Also, an RU Allocation field (1120) may be included. In other words, when a receiving STA identified by the User Identifier field (1110) transmits a UL PPDU in response to the trigger frame of FIG. 9, the corresponding UL PPDU is transmitted through an RU indicated by the RU Allocation field (1120). In this case, it is preferable that the RU indicated by the RU Allocation field (1120) indicates the RUs shown in FIGs. 4, 5, and 6. A specific structure of the RU Allocation field (1120) will be described later.

The subfield of FIG. 11 may include a (UL FEC) coding type field (1130). The coding type field (1130) may indicate the coding type of an uplink PPDU transmitted in response to the trigger frame of FIG. 9. For example, when BCC coding is applied to the uplink PPDU, the coding type field (1130) may be set to '1', and when LDPC coding is applied, the coding type field (1130) may be set to '0'.

Additionally, the subfield of FIG. 11 may include a UL MCS field (1140). The MCS field (1140) may indicate an MCS scheme being applied to the uplink PPDU that is transmitted in response to the trigger frame of FIG. 9.

Also, the subfield of FIG. 11 may include a Trigger Dependent User Info field (1150). When the Trigger Type field (1010) of FIG. 10 indicates a basic trigger variant, the Trigger Dependent User Info field (1150) may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a fist control field including control information required to interpret the PPDU and a second control field including control information for demodulate the data field of the PPDU. The first and second control fields may be used for various fields. For example, the first control field may be the HE-SIG-A (730) of FIG. 7, and the second control field may be the HE-SIG-B (740) shown in FIGS. 7 and 8.

Hereinafter, a specific example of improving the first or the second control field will be described.

In the following example, a control identifier inserted to the first control field or a second control field is proposed. The size of the control identifier may vary, which, for example, may be implemented with 1-bit information.

The control identifier (for example, a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (namely, 20 MHz). Accordingly, the control identifier (for example, 1-bit identifier) may indicate whether a single RU corresponding to the full bandwidth of the transmission frequency band is allocated.

For example, if the transmission frequency band has a bandwidth of 40 MHz, the control identifier (for example, a 1-bit identifier) may indicate whether a single RU corresponding to the full bandwidth (namely, bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (for example, a 1-bit identifier) may indicate whether a single RU corresponding to the full bandwidth (namely, bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (for example, 1-bit identifier).

First of all, when a single RU corresponding to the full bandwidth of the transmission frequency band is allocated through the control identifier (for example, a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (for example, spatial multiplexing) may be used to multiplex the signals for multiple users in the same, single RU. Accordingly, the control identifier (for example, a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields).

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain.

The user-specific field included in the second control field (HE-SIG-B, 740) may include a user field, a CRC field, and a Tail field.

Also, the user-specific field of the HE-SIG-B is composed of a plurality of user fields. The plurality of user fields are located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only in one user field.

As an example, it may be assumed that the RU allocation subfield is configured with 8 bits of 01000010 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

User fields included in the user-specific field of the HE-SIG-B may be defined as described below. Firstly, user fields for non-MU-MIMO allocation are as described below.

User fields for MU-MIMO allocation are as described below.

Figure 12:
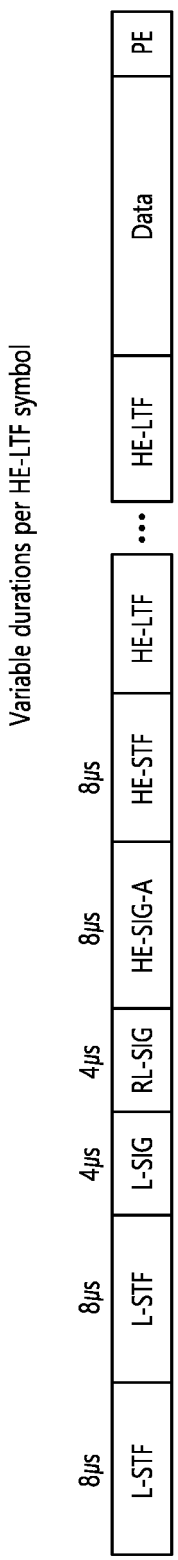
FIG. 12 illustrates an example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit a HE TB PPDU simultaneously with another STA which has received the trigger frame.

As shown in the figure, the PPDU of FIG. 12 includes various fields, each of which corresponds to the field shown in FIG. 2, FIG. 3, and FIG. 7. Meanwhile, as shown in the figure, the HE TB PPDU (or uplink PPDU) of FIG. 12 may not include the HE-SIG-B field but only the HE-SIG-A field.

1. CSMA/CA (Carrier Sense Multiple Access/Collision Avoidance)

In IEEE 802.11, communication is achieved in a shared wireless medium, and thus has a characteristic fundamentally different from a wired channel environment. For example, communication is possible based on carrier sense multiple access/collision detection (CSMA/CD) in the wired channel environment. For example, when a signal is transmitted one time in Tx, the signal is transmitted to Rx without significant signal attenuation since a channel environment does not change much. In this case, when a collision occurs in two or more signals, it is detectable. This is because power detected in Rx is instantaneously greater than power transmitted in Tx. However, in a wireless channel environment, a channel is affected by various factors (e.g., a signal may be significantly attenuated according to a distance or may instantaneously experience deep fading), carrier sensing cannot be achieved correctly in Tx as to whether a signal is properly transmitted in Rx in practice or whether a collision exists. Therefore, a distributed coordination function (DCF) which is a carrier sense multiple access/collision avoidance (CSMA/CA) mechanism is introduced in 802.11. Herein, stations (STAs) having data to be transmitted perform clear channel assessment (CCA) for sensing a medium during a specific duration (e.g., DIFS: DCF inter-frame space) before transmitting the data. In this case, if the medium is idle, the STA can transmit the data by using the medium. On the other hand, if the medium is busy, under the assumption that several STAs have already waited for the use of the medium, the data can be transmitted after waiting by a random backoff period in addition to the DIFS. In this case, the random backoff period can allow the collision to be avoidable because, under the assumption that there are several STAs for transmitting data, each STA has a different backoff interval probabilistically and thus eventually has a different transmission time. When one STA starts transmission, the other STAs cannot use the medium.

The random backoff time and the procedure will be simply described as follows. When a specific medium transitions from busy to idle, several STAs start a preparation for data transmission. In this case, to minimize a collision, the STAs intending to transmit the data select respective random backoff counts and wait by those slot times. The random backoff count is a pseudo-random integer value, and one of uniform distribution values is selected in the range of [0 CW]. Herein, CW denotes a contention window. A CW parameter takes a CWmin value as an initial value, and when transmission fails, the value is doubled. For example, if an ACK response is not received in response to a transmitted data frame, it may be regarded that a collision occurs. If the CW value has a CWmax value, the CWmax value is maintained until data transmission is successful, and when the data transmission is successful, is reset to the CWmin value. In this case, the values CW, CWmin, and CWmax are preferably maintained to $2^n-1$ for convenience of implementations and operations. Meanwhile, if the random backoff procedure starts, the STA selects the random backoff count in the [0 CW] range and thereafter continuously monitors a medium while counting down a backoff slot. In the meantime, if the medium enters a busy state, the countdown is stopped, and when the medium returns to an idle state, the countdown of the remaining backoff slots is resumed.

2. PHY Procedure

A PHY transmit/receive procedure in Wi-Fi is as follows, but a specific packet configuration method may differ. For convenience, only 11n and 11ax will be taken for example, but 11g/ac also conforms to a similar procedure.

That is, in the PHY transmit procedure, a MAC protocol data unit (MPDU) or an aggregate MPDU (A-MPDU) transmitted from a MAC end is converted into a single PHY service data unit (PSDU) in a PHY end, and is transmitted by inserting a preamble, tail bits, and padding bits (optional), and this is called a PPDU.

The PHY receive procedure is usually as follows. When performing energy detection and preamble detection (L/HT/VHT/HE-preamble detection for each WiFi version), information on a PSDU configuration is obtained from a PHY header (L/HT/VHT/HE-SIG) to read a MAC header, and then data is read.

3. Multi-Band (or Multi-Link) Aggregation

In order to increase a peak throughput, transmission of an increased stream is considered in a WLAN 802.11 system by using a wider band or more antennas compared to the legacy 11a. In addition, a method of using various bands by aggregating the bands is also considered.

The present specification proposes a scheme of transmitting data of HE STAs and HE STAs simultaneously by using the same MU PPDU in a situation of considering a wide bandwidth, a multi-band (or multi-link) aggregation, or the like.

Figure 13:
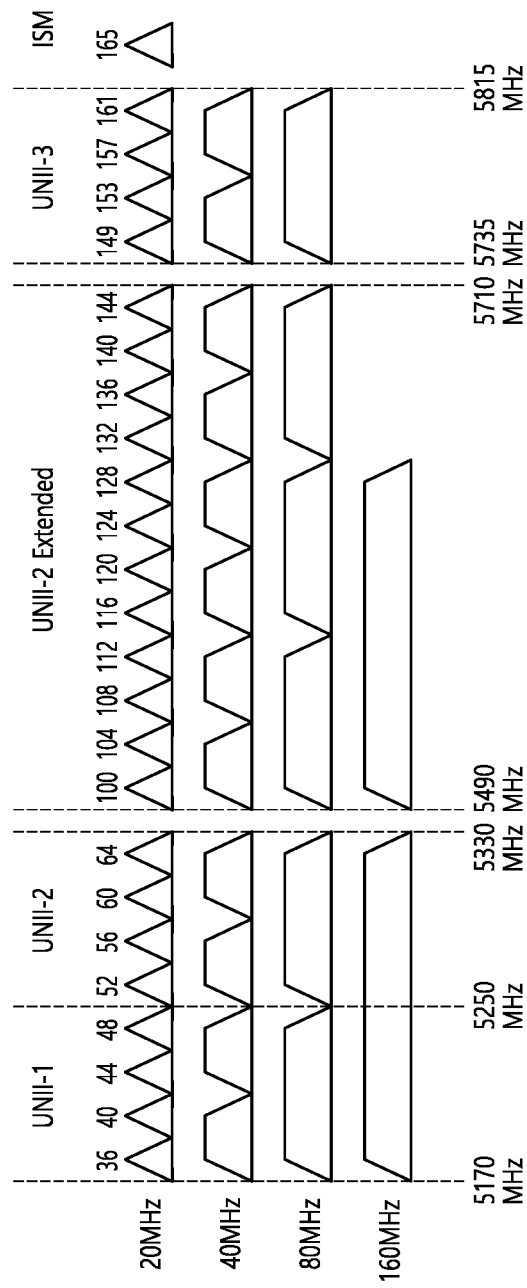
FIG. 13 illustrates multiple channels allocated in a 5 GHz band.

FIG. 13 illustrates multiple channels allocated in a 5 GHz band.

Hereinafter, a "band" may include, for example, 2.4 GHz, 5 GHz, and 6 GHz bands. For example, the 2.4 GHz band and the 5 GHz band are supported in the 11n standard, and up to the 6 GHz band is supported in the 11ax standard. For example, in the 5 GHz band, multiple channels may be defined as shown in FIG. 13.

The WLAN system to which technical features of the present specification are applied may support a multi-band. That is, a transmitting STA can transmit a PPDU through any channel (e.g., 20/40/80/80+80/160/240/320 MHz, etc.) on a second band (e.g., 6 GHz) while transmitting the PPDU through any channel (e.g., 20/40/80/80+80/160 MHz, etc.) on a first band (e.g., 5 GHz) (In the present specification, a 240 MHz channel may be a continuous 240 MHz channel or a combination of discontinuous 80/160 MHz channels. Further, a 320 MHz channel may be a continuous 320 MHz channel or a combination of discontinuous 80/160 MHz channels. For example, in the present document, the 20 MHz channel may be a continuous 240 MHz channel, an 80+80+80 MHz channel, or an 80+160 MHz channel).

In addition, the multi-band described in the present document can be interpreted in various meanings. For example, the transmitting STA may set any one of 20/40/80/80+80/160/240/320 MHz channels on the 6 GHz band to the first band, set any one of other 20/40/80/80+80/160/240/320 MHz channels on the 6 GHz band to the second band, and may perform multi-band transmission (i.e., transmission simultaneously supporting the first band and the second band). For example, the transmitting STA may transmit the PPDU simultaneously through the first band and the second band, and may transmit it through only any one of the bands at a specific timing.

At least any one of primary 20 MHz and secondary 20/40/80/160 MHz channels described below may be transmitted in the first band, and the remaining channels may be transmitted in the second band. Alternatively, all channels may be transmitted in the same one band.

In the present specification, the term "band" may be replaced with "link".

Next, a control signaling method for multi-band aggregation will be described. Since the control signaling method may employ a fast session transfer (FST) setup method, an FST setup protocol will be described below.

The FST setup protocol consists of four states and a rule for a method of transitioning from one state to a next state. The four states are Initial, Setup Completed, Transition Done, and Transition Confirmed. In the Initial state, an FST session operates in one or two bands/channels. In the Setup Complete state, an initiator and a responder are ready to change band/channel(s) currently operating. The FST session may be transferred entirely or partially to another band/channel. The Transition Done state allows the initiator and responder to operate in different bands/channels when a value of link loss timeout (LLT) is 0. Both the initiator and the responder shall communicate successfully in a new band/channel to reach the Transition Confirmed state. A state transition diagram of the FST setup protocol is shown in FIG. 14.

Figure 14:
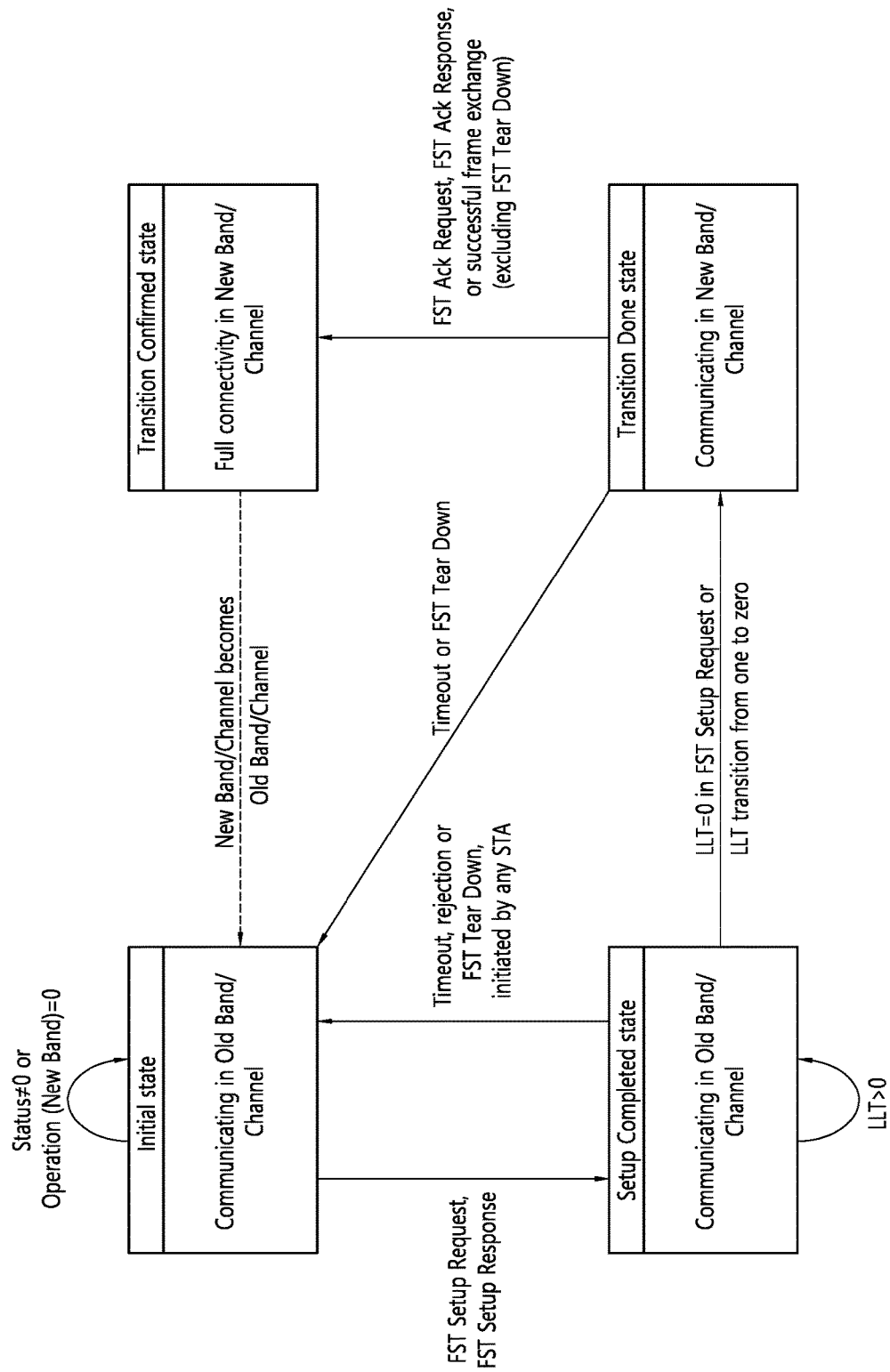
FIG. 14 illustrates four states of an FST setup protocol.

FIG. 14 illustrates four states of the FST setup protocol.

Figure 15:
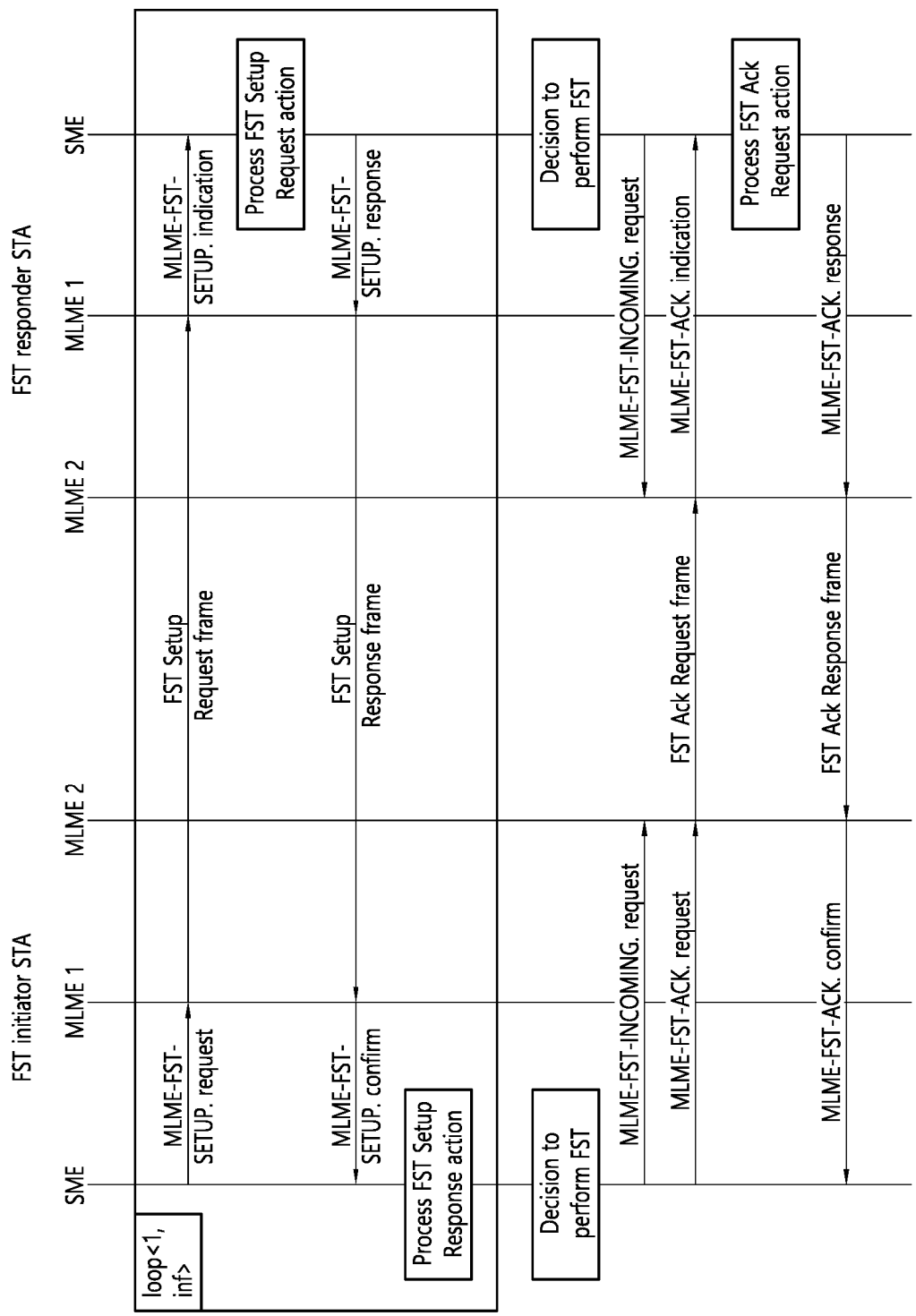
FIG. 15 illustrates a procedure of an FST setup protocol

FIG. 15 illustrates a procedure of the FST setup protocol.

FIG. 15 illustrates a procedure of the FST setup protocol for driving a state machine shown in FIG. 14. The procedure of FIG. 15 is an example of a basic procedure, and does not cover all possible usages of the protocol. In FIG. 15, a MAC layer management entity (MLME) 1 and an MLME 2 represent any two MLMEs of a device in which a multi-band is possible according to a reference model described in a reference model for a multi-band operation. As will be described later, FST Setup Request and FST Setup Response frames are exchanged optionally in a repeated manner until an FST initiator and an FST responder move successfully in a Setup Completed state. An operation of the procedure of the FST setup protocol is exemplified in FIG. 15.

In order to establish an FST session in an Initial state and to transfer it in the Setup Completed state of the FST setup protocol, the initiator and the responder shall exchange FST Setup Request and FST Setup Response frames. The FST session exists in the Setup Completed state, a Transition Done state, or a Transition Confirmed state. In the Initial state and the Setup Completed state, an old band/channel represents a frequency band/channel on which the FST session is transferred, and a new band/channel represents a frequency band/channel on which the FST session is transferred. In the Transition Done state, the new band/channel represents a frequency band/channel on which FST Ack Request and FST Ack Response frames are transmitted, and the old band/channel represents a frequency band/channel on which the FST session is transferred.

If the responder accepts the FST Setup Request, a Status Code field is set to SUCCESS, and a Status Code is set to REJECTED_WITH_SUGGESTED_CHANGES. Thus, one or more parameters of the FST Setup Request frame are invalid, and a replacement parameter shall be proposed. In addition, the responder sets the Status Code field to PENDING_ADMITTING_FST_SESSION or PENDING_GAP_IN_BA_WINDOW to indicate that the FST Setup Request is pending, and sets the Status Code field to REQUEST_DECLINED to reject the FST Setup Request frame.

A responder which is an enabling STA sets a Status Code to REJECT_DSE_BAND and thus is initiated by a dependent STA which requests to switch to a frequency band subject to a DSE procedure. Therefore, it is indicated that the FST Setup Request frame is rejected. In this case, if a responder is an enabling STA for the dependent STA, the responder may indicate a duration in a TU before an FST setup starts with respect to the dependent STA by including a Timeout Interval element in the FST Setup Response frame. A Timeout Interval Type field in the Timeout Interval element shall be set to 4. The responder may use a parameter in the FST Setup Request frame received from the dependent STA to initiate the FST setup with respect to the initiator.

A responder which is a dependent STA and which is not enabled shall reject all FST Setup Request frames received for switching to a frequency band subject to the DSE procedure, except for a case where a transmitter of the FST setup Request frame is an enabling STA of the dependent STA.

4. Embodiments Applicable to the Present Disclosure

Figure 16:
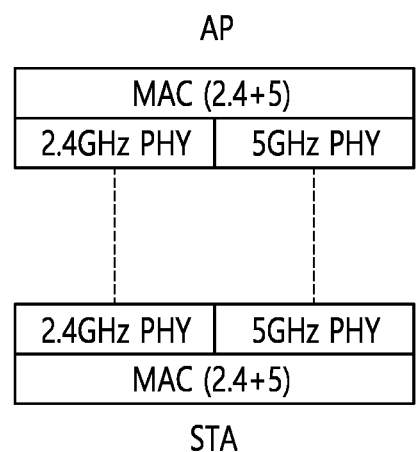
FIG. 16 illustrates an example of multi-band aggregation using a 2.4 GHz band and a 5 GHz band.

FIG. 16 illustrates an example of multi-band aggregation using a 2.4 GHz band and a 5 GHz band.

Referring to FIG. 16, an AP and a STA may transmit and receive data through aggregation of the 2.4 GHz band and the 5 GHz band. Multi-band aggregation may be performed using not only 2.4./5 GHz but also any bands ranging from 1 to 7.125 GHz, and aggregation may also be performed using a plurality of RFs within the same band (e.g., 5 GHz). Therefore, there is an opportunity to use not only a bandwidth used in legacy 802.11 but also a bandwidth of 160 MHz or more (e.g., 320 MHz) by employing multi-band aggregation or a plurality of RFs within the same band.

In order to conduct conventional contention in a structure illustrated in FIG. 16, backoff is performed for one designated 20 MHz primary channel (Primary 20 or P20) regardless of a multi-band, and a transmission bandwidth is determined by determining whether a secondary channel is idle/busy during a previous PIFS (or DIFS) at a moment when transmission is possible in P20 (backoff count=0).

However, as a considerably wide bandwidth of 160 MHz or more can be used, a secondary channel having a wide bandwidth, such as a 160 MHz secondary channel (Secondary 160) and a 320 MHz secondary channel (Secondary 320), may exist. Particularly, in a dense environment, the secondary channel is highly likely to be busy and thus is remarkably less likely to be available. Further, when CCA is performed on the secondary channel according to a legacy CCA rule (Primary 20→Secondary 20→Secondary 40 . . . ), the legacy rule cannot be used in a band aggregation combination (e.g., 120 (40+80) MHz, 240 (80+160) MHz, and the like) other than that in 20/40/80/160/320 MHz.

Therefore, to solve the foregoing problems, the present disclosure proposes a contention method in which a primary channel is assigned for each band (or RF).

Figure 17:
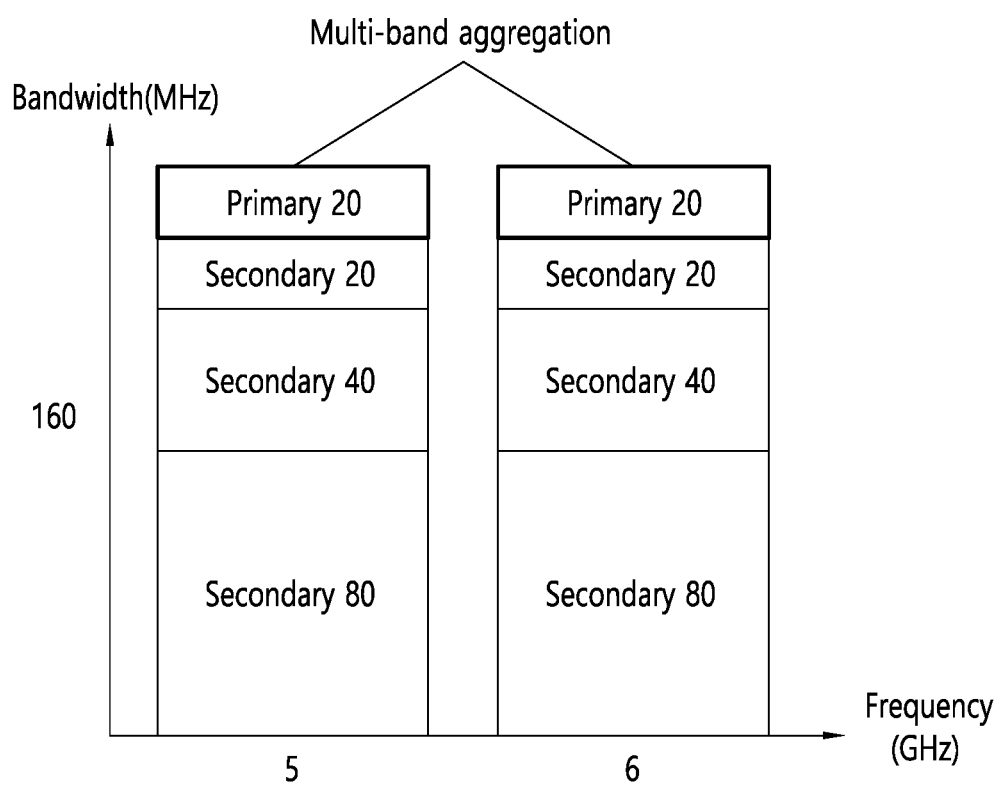
FIG. 17 illustrates an example in which a primary channel exists in each band (or RF) when performing multi-band aggregation.

FIG. 17 illustrates an example in which a primary channel exists in each band (or RF) when performing multi-band aggregation.

As illustrated in FIG. 17, when 160 MHz of a 5 GHz band and 160 MHz of a 6 GHz band are aggregated, P20 exists in each band, in which P20 may exist regardless of a bandwidth size (20 MHz or more) applied in each band (or RF).

Basically, a Wi-Fi system performs contention based on one P20, and an EDCA function (EDCAF) requires a contention window (CW) value and a backoff count (BC) randomly selected in a range from 0 to CW for contention for each access category (AC). Therefore, when there is a plurality of primary channels, that is, when a primary channel exists in each band (or RF), a new contention rule is required for frame transmission, and a CW and a BC may be applied as follows.

A. To apply common CW to all P20s and separate BC to each P20
→ In method A, a legacy BC decrement rule for each primary channel can be flexibly applied, while more processing overhead is required. Further, a CW adjustment method depending on success in transmission in each band is additionally required.

B. To apply common CW and common BC to all P20s
→ In method B, one CW and one BC can be maintained as conventionally regardless of the number of primary channels, while a new BC decrement rule is required according to the channel state of each P20.

C. To apply separate CW to each P20 and separate BC to each P20
→ In method C, the legacy BC decrement rule for each primary channel and a legacy CW adjustment method depending on success in transmission can be flexibly applied, while more processing overhead is required.

When method B is applied, the BC decrement rule may be applied as follows.

1) To reduce BC value when channel states of all P20s are idle
   → Since all P20s are viewed in an integrated manner, the probability of a collision may be reduced, but transmission latency may be increased.
2) To reduce BC value when channel state of at least one of all P20s is idle
   → 1) Although transmission latency may be reduced compared to method 1), the probability of a collision may increase because another busy P20 is ignored.

In IEEE 802.11ac, information on a channel currently used by an AP is notified to a terminal using a VHT Operation element.

Figure 18:
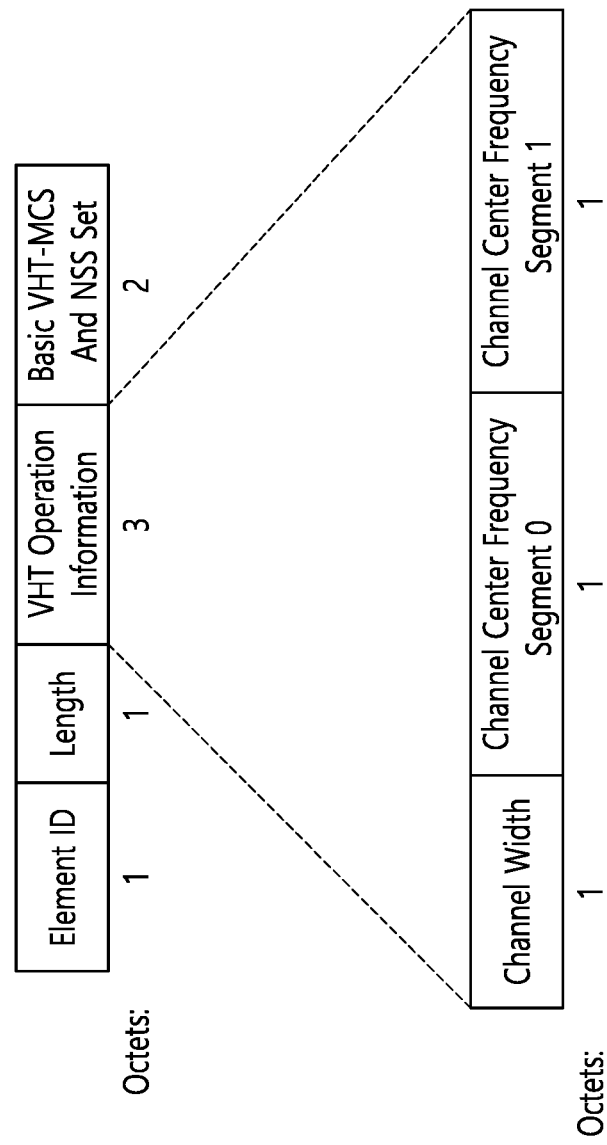
FIG. 18 illustrates an example of a VHT Operation element format.

FIG. 18 illustrates an example of a VHT Operation element format.

The operation of a VHT STA in a BSS is controlled by a HT Operation element and a VHT Operation element of FIG. 18.

The VHT STA obtains primary channel information from the HT Operation element. A VHT Operation Information subfield of FIG. 18 may be defined as follows.

TABLE 1

| Subfield | Definition | Encoding |
| --- | --- | --- |
| Channel Width | This field, together with the HT Operation elements STA Channel Width field, defines the BSS bandwidth | Set to 0 for 20 MHz or 40 MHz BSS bandwidth. Set to 1 for 80 MHz, 160 MHz or 80 + 80 MHz BSS bandwidth. Set to 2 for 160 MHz BSS bandwidth (deprecated). Set to 3 for non-contiguous 80 + 80 MHz BSS bandwidth (deprecated). Values in the range 4 to 255 are reserved. |
| Channel Center Frequency Segment 0 | Defines a channel center frequency for a 20, 40, 80, 160, or 80 + 80 MHz VHT BSS | For a 20, 40, or 80 MHz BSS bandwidth, indicates the channel center frequency index for the 20, 40, or 80 MHz channel on which the VHT BSS operates. For a 160 MHz BSS bandwidth and the Channel Width subfield equal to 1, indicates the channel center frequency index of the 80 MHz channel segment that contains the primary channel. For a 160 MHz BSS bandwidth and the Channel Width subfield equal to 2, indicates the channel center frequency index of the 160 MHz channel on which the VHT BSS operates. For an 80 + 80 MHz BSS bandwidth and the Channel Width subfield equal to 1 or 3, indicates the channel center frequency index for the primary 80 MHz channel of the VHT BSS. Reserved otherwise. |
| Channel Center Frequency Segment 1 | Defines a channel center frequency for a 160 or 80 + 80 MHz VHT BSS | For a 20, 40, or 80 MHz BSS bandwidth, this subfield is set to 0. For a 160 MHz BSS bandwidth and the Channel Width subfield equal to 1, indicates the channel center frequency index of the 160 MHz channel on which the VHT BSS operates. For a 160 MHz BSS bandwidth and the Channel Width subfield equal to 2, this field is set to 0. For an 80 + 80 MHz BSS bandwidth and the Channel Width subfield equal to 1 or 3, indicates the channel center frequency index of the secondary 80 MHz channel of the VHT BSS. Reserved otherwise. |

When a Channel Width subfield of the VHT Operation Information subfield is set to 1, a BSS bandwidth may be 80 MHz, 160 MHz, or 80+80 MHz. Here, the BSS bandwidth according to the value of a Channel Center Frequency Segment (CCFS) 1 subfield may be defined as follows.

TABLE 2

| Channel Center Frequency Segment 1 subfield value | BSS bandwidth |
| --- | --- |
| CCFS1 = 0 | 80 MHz or less |
| CCFS1 > 0 and |CCFS1-CCFS0| = 8 (40 MHz apart) | 160 MHz (CCFS0: center frequency of the 80 MHz channel segment that contains the primary channel) (CCFS1: center frequency of the 160 MHz channel) |
| CCFS1 > 0 and |CCFS1-CCFS0| > 16 (80 MHz apart) | 80 + 80 MHz (CCFS0: center frequency of the primary 80 MHz channel) (CCFS1: center frequency of the secondary 80 MHz channel) |
| CCFS1 > 0 and |CCFS1-CCFS0| < 8 (40 MHz apart) | Reserved |
| CCFS1 > 0 and 8<|CCFS1-CCFS0| <= 16 (>40 MHz apart and <=80 MHz apart) | Reserved |

NOTE 1—
CCFS0 represents the value of the Channel Center Frequency Segment 0 subfield
NOTE 2—
CCFS1 represents the value of the Channel Center Frequency Segment 1 subfield A channel center frequency (CCF, in MHz) may be obtained by channel starting frequency+ 5*dot11CurrentChannelCenterFrequencyIndex.

Figure 19:
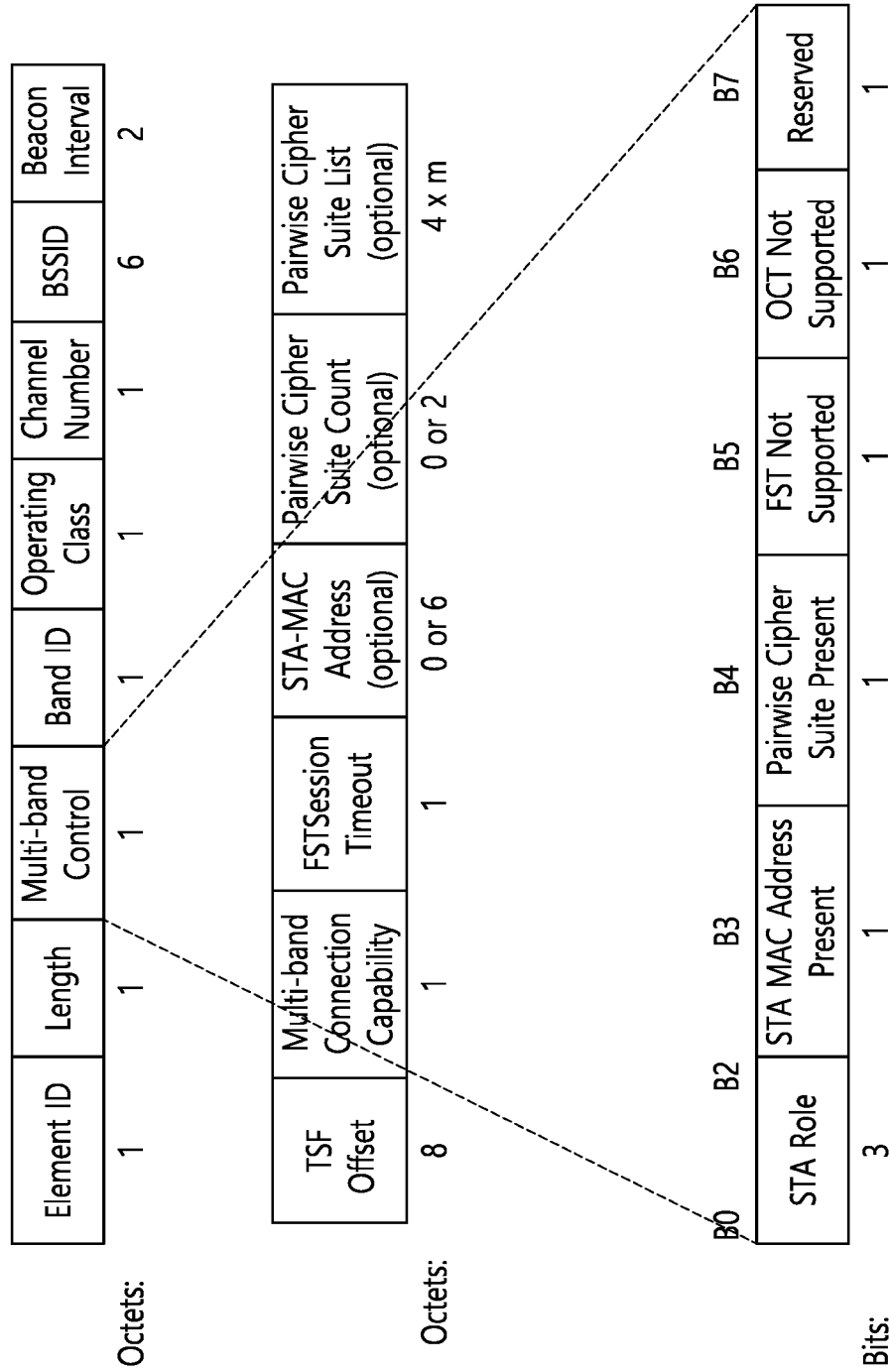
FIG. 19 illustrates an example of a Multi-band element format.

FIG. 19 illustrates an example of a Multi-band element format.

A Multi-band element of FIG. 19 indicates that a STA transmitting the element is included in a multi-band device capable of operating in a frequency band, an operating class, or a channel other than a channel through which the element is transmitted. Further, when part of fast session transfer (FST) is used, the element indicates that the transmitting STA is capable of performing a FST from a current channel to a channel used by a different STA in the same device in the same band or a different band.

The Multi-band element of FIG. 19 includes a Multi-band Control field, and the Multi-band Control field includes STA Role, STA MAC Address Present, Pairwise Cipher Suite Present, FST Not Supported, and OCT Not Supported fields, and the like.

5. Proposed Embodiments

The present disclosure proposes a method for a STA using an antenna/RF supporting two or more different bands (e.g., 5 GHz and 6 GHz) to change a transmission band of at least one antenna/RF.

Although there are existing APs supporting two or more bands at the same time, the APs are actually the same only in physical location but are used in separately established BSSs. Therefore, each AP communicates with each STA in each BSS.

Currently, 802.11ax has extended a supported transmission band to 6 GHz, and EHT or 802.11be, which is currently under standardization, is also scheduled to support a 6 GHz band. A device supporting 5 GHz and 6 GHz can operate an antenna/RF chain exclusively to each band as done so far but may include a switchable antenna/RF chain capable of supporting both 5 GHz and 6 GHz due to a spatial constraint of the device.

When an increasing number of APs operating 5 GHz and 6 GHz are deployed and STAs also operate a switchable antenna/RF chain capable of supporting 5 GHz and 6 GHz, a band and channel negotiation process between the APs and the STAs is necessary for flexible and efficient transmission and reception.

The present disclosure proposes a band negotiation process for each antenna/RF chain in a process in which a STA using a switchable antenna/RF chain capable of supporting a plurality of bands performs transmission and reception with an AP. To this end, the present disclosure also proposes a method for exchanging pieces of information on antenna/RF chains of an AP and a STA with each other in an association time.

5.1. Operation Procedure

1) Association Request/Response Exchange Process

According to the present disclosure, it is necessary to exchange information on a switchable antenna/RF chain between an AP and a STA in an AP-STA association process or in a subsequent process. The information may be indicated through an appropriate element in an association request/response exchange process or may also be indicated in advance through a neighbor report or beacon frame.

2) Operating Band Negotiation Process

Figure 20:
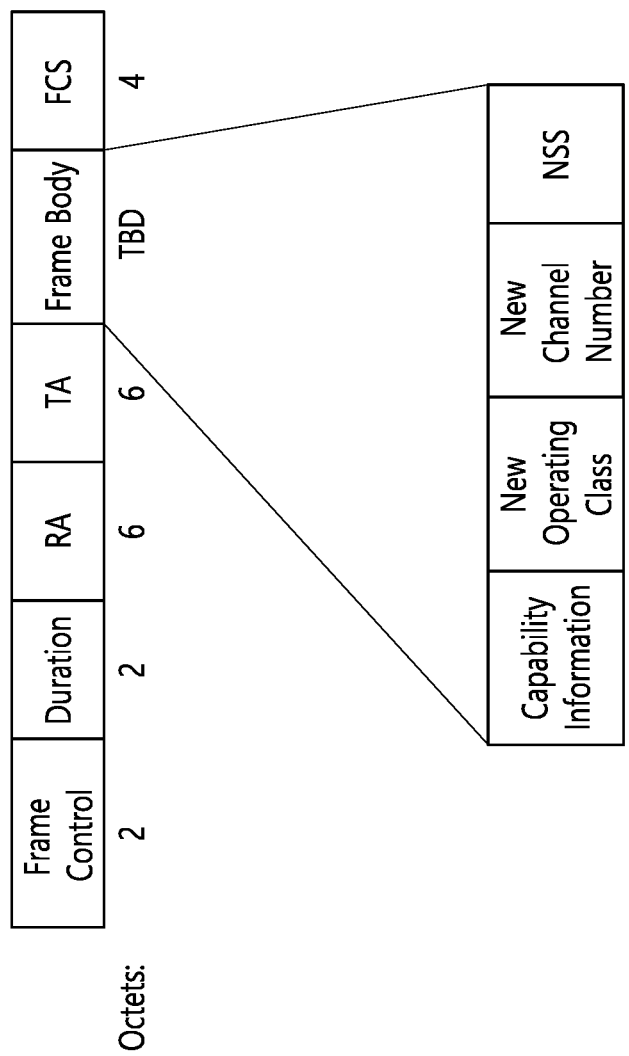
FIG. 20 illustrates an example of an operating band negotiation request frame format.

FIG. 20 illustrates an example of an operating band negotiation request frame format.

Figure 21:
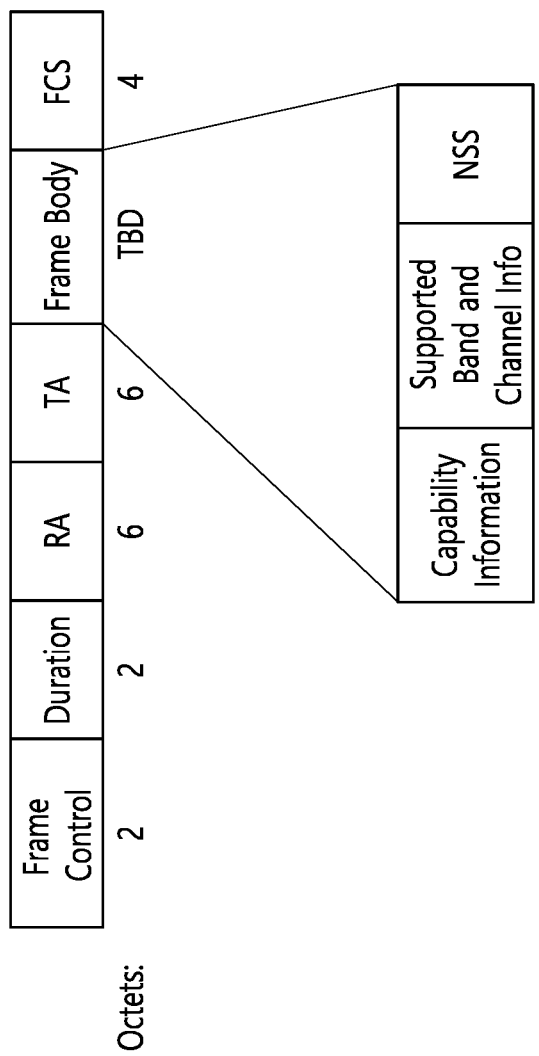
FIG. 21 illustrates another example of an operating band negotiation request frame format.

FIG. 21 illustrates another example of an operating band negotiation request frame format.

When the STA and the AP know information on each other's antenna/RF chains through the foregoing method and the STA using switchable antenna/RF chains desires to change the operating band and channel of at least one antenna/RF chain, the STA may perform operating band negotiation with the AP. The STA may transmit an operating band negotiation request frame in the format illustrated in FIG. 20. Alternatively, when a unique ID is assigned to the operating band and channel of the AP, the STA may transmit an operating band negotiation request frame in the format illustrated in FIG. 21. When the AP desires to change an antenna/RF chain of the STA, the AP may perform operating band negotiation in the same manner.

The operating band negotiation request frames of FIG. 20 and FIG. 21 may include pieces of information as follows.

RA: Receiver address
TA: Transmitter address
Capability Information: Optional capability information New Operating Class: Includes operating class information on a band after switching. Country element and operating class values specified in the 802.11 baseline specification can be used.

New Channel Number: Includes information on an operating channel after band switching. Country element and operating class values specified in the 802.11 baseline specification can be used.

NSS: Indicates the number of spatial streams to be operated in a band and a channel corresponding to the new operating class and the new channel number defined above.

Supported Band and Channel Info: If there is an already negotiated ID for a band or channel operated by the AP, the ID can be used.

Figure 22:
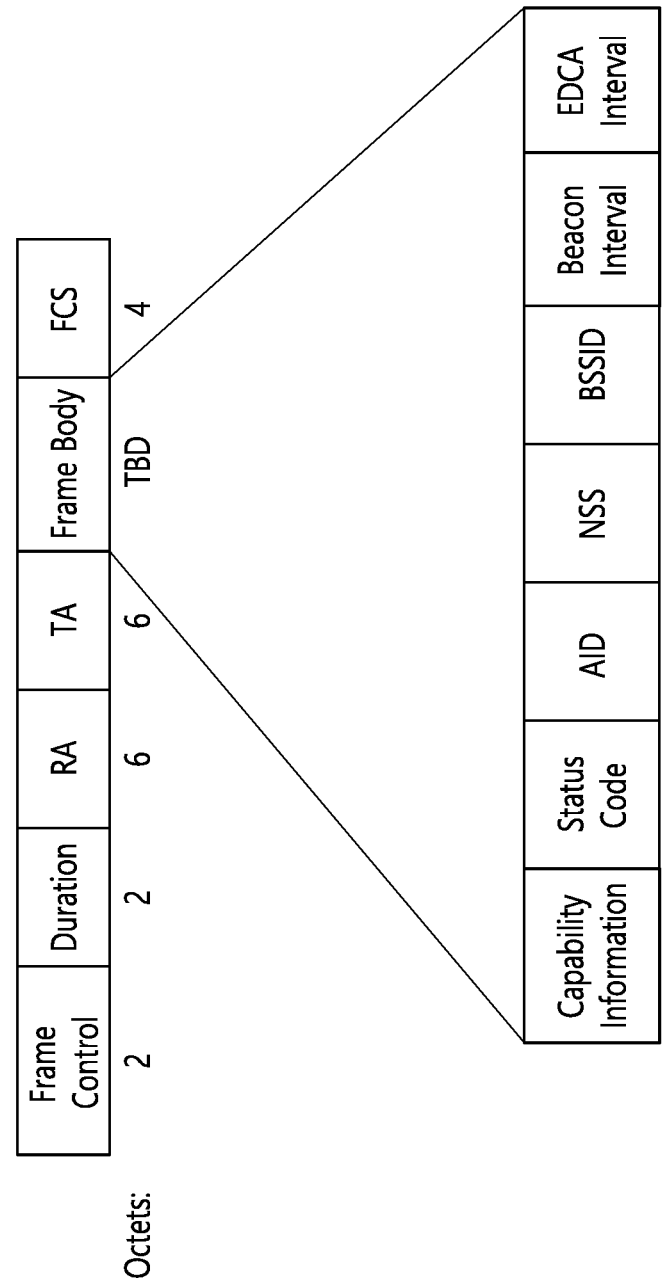
FIG. 22 illustrates an example of an operating band negotiation response frame format.

FIG. 22 illustrates an example of an operating band negotiation response frame format.

Upon receiving the operating band negotiation request frame, the AP may transmit an operating band negotiation response frame or an existing ACK frame in response to the operating band negotiation request frame. That is, the AP may configure the operating band negotiation response frame as illustrated in FIG. 22. The operating band negotiation response frame may include pieces of information as follows.

New Operating Class: Includes operating class information on a band after switching. Country element and operating class values specified in the 802.11 baseline specification can be used.

New Channel Number: Includes information on an operating channel after band switching. Country element and operating class values specified in the 802.11 baseline specification can be used.

NSS: Indicates the number of spatial streams to be operated in a band and a channel corresponding to the new operating class and the new channel number defined above.

BSSID: Indicates the BSSID of a new BSS to be established when the BSS is established. This information can be omitted if the same BSSID is used.

Beacon Interval: Indicates a beacon interval in a defined channel. This information can be omitted if the same beacon interval is used.

EDCA Interval: Indicates time information on an interval if there is an EDCA/scheduled-only access interval in a defined channel.

Figure 23:
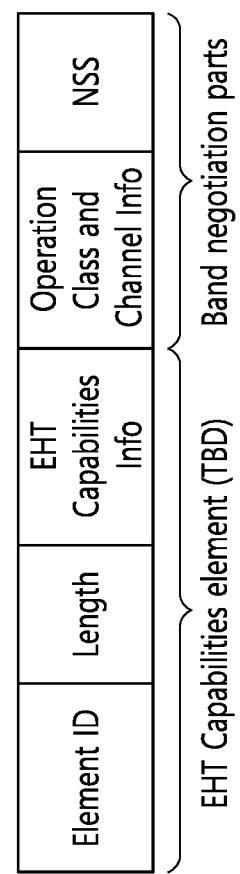
FIG. 23 illustrates an example of an EHT Capabilities element format.

FIG. 23 illustrates an example of an EHT Capabilities element format.

The STA may transmit an element, rather than a frame, to the AP. According to existing specifications, the AP and the STA may exchange capability information and operation information through an HT Capability/Operation, VHT Capability/Operation, or HE Capability/Operation element. Likewise, in an EHT system, an EHT Capability/Operation element may be designed, and a band negotiation process may be performed through the element. As proposed in FIG. 23, an EHT Capabilities element may include an Operation Class and Channel Info field and an NSS field, thereby negotiating for band and channel switching of an antenna/RF chain of the STA.

5.2. Embodiments in which AP Changes at Least One Antenna/RF Chain to Another Band 1) Embodiment for Multi-Band-Incapable STA 1

Figure 24:
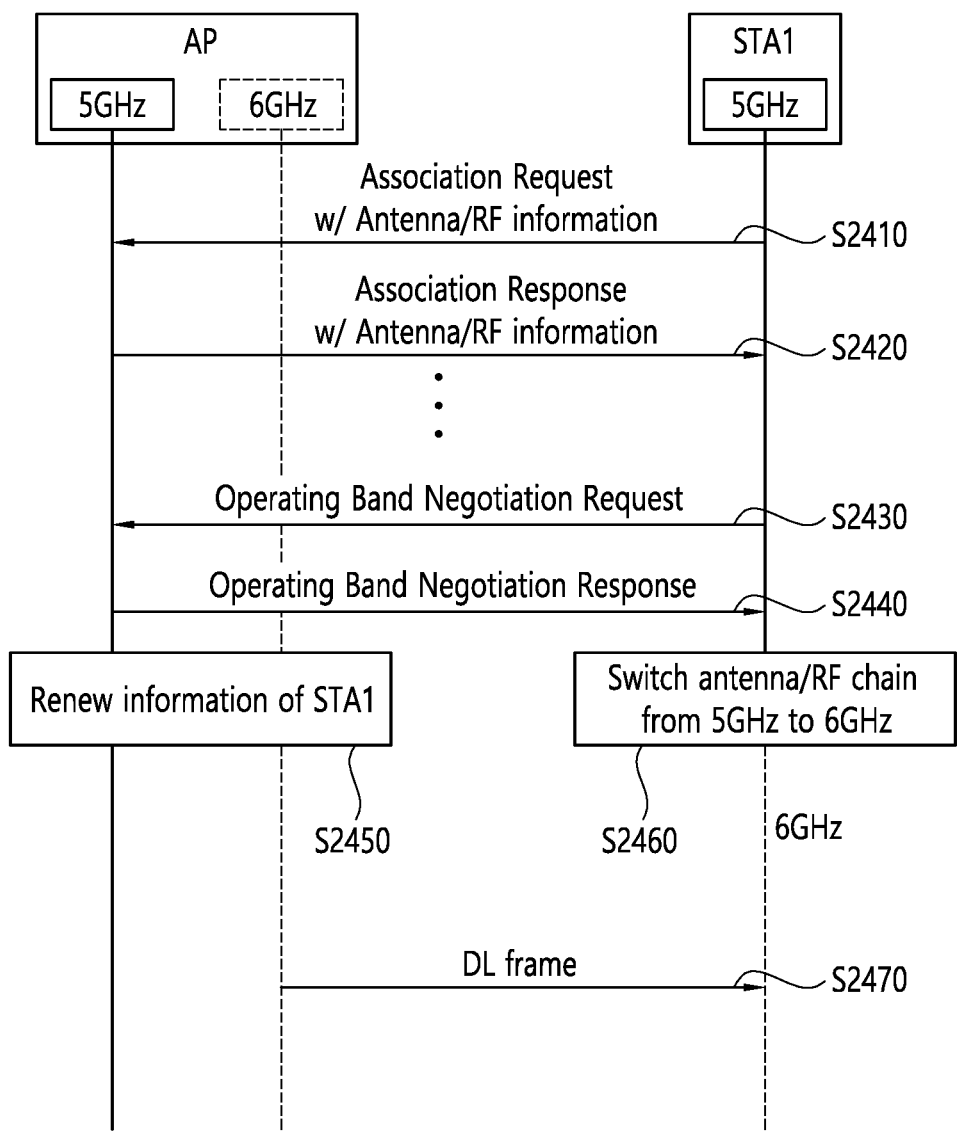
FIG. 24 is a flowchart illustrating an example of an operating band switching procedure.

FIG. 24 is a flowchart illustrating an example of an operating band switching procedure.

Figure 25:
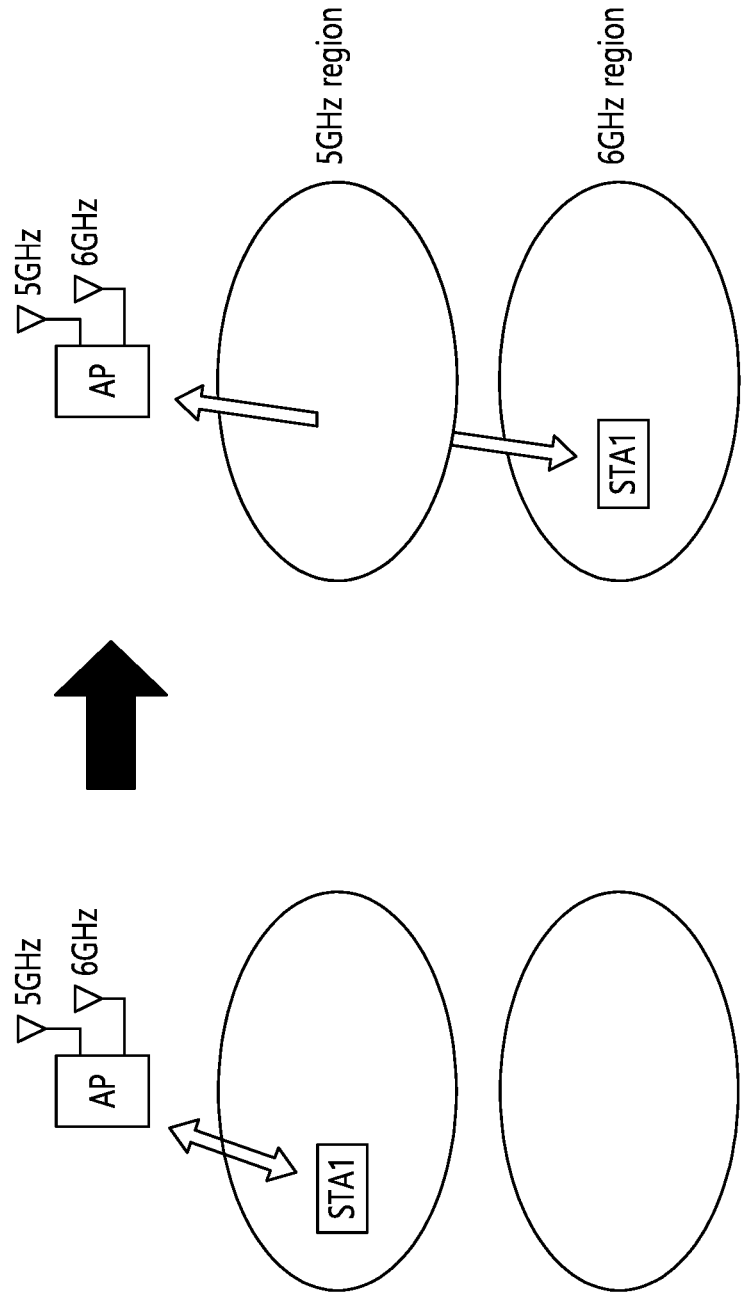
FIG. 25 illustrates an example of an operating band switching procedure.

FIG. 25 illustrates an example of an operating band switching procedure.

When an AP operates a multi-band of 5 GHz and 6 GHz and knows that STA 1 can use a switchable antenna/RF chain, the AP may perform an operating band negotiation with STA1. STA 1 exchanges antenna/RF chain information (e.g., the number of switchable antennas/RF chains, a supportable band, and the like) in a process of association with the AP (S2410 and S2420). When STA 1, which knows that the AP supports 6 GHz, desires to operate a switchable antenna/RF chain in 6 GHz, STA 1 exchanges operating band negotiation request/response frames (S2430 and S2440) and then switches from 5 GHz to 6 GHz (S2460). The AP updates information on STA 1 (S2450) and then transmits and receives data in the switched 6 GHz band (S2470). A series of processes is illustrated in FIG. 24 and FIG. 25. In addition, the AP may first transmit an operating band negotiation request, thereby adjusting the band of the antenna/RF chain of the receiving STA.

2) Embodiment for Multi-Band-Capable STA 2 (5 GHz RF×4→5 GHz RF×2+6 GHz RF×2, Supporting Multi-Band)

FIG. 26 is a flowchart illustrating another example of an operating band switching procedure.

Figure 27:
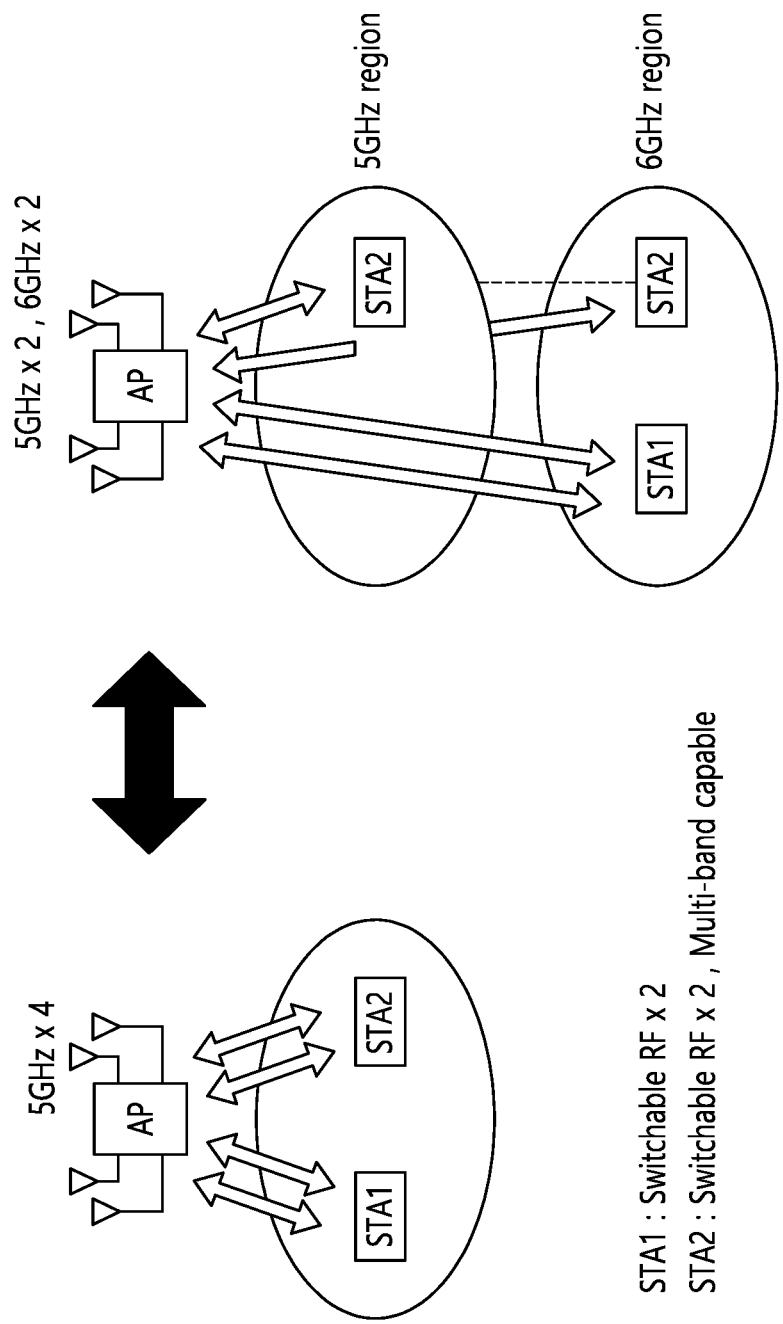
FIG. 27 illustrates an example of another operating band switching procedure.

FIG. 27 illustrates another example of an operating band switching procedure.

The same scenario may be applied to multi-band-capable STA 2. When an AP operates a multi-band of 5 GHz and 6 GHz and knows that STA 2 can use a switchable antenna/RF chain, the AP may perform an operating band negotiation with STA2. STA 2 exchanges antenna/RF chain information (e.g., the number of switchable antennas/RF chains, a supportable band, and the like) in a process of association with the AP (S2610 and S2620). When STA 2, which knows that the AP supports 6 GHz, desires to operate a switchable antenna/RF chain in 6 GHz, STA 2 exchanges operating band negotiation request/response frames (S2630 and S2640) and then switches from 5 GHz to 6 GHz (S2660). The AP updates information on STA 2 (S2650) and then transmits and receives data simultaneously in a multi-band of 5 GHz and 6 GHz (S2670). A series of processes is illustrated in FIG. 26 and FIG. 27. In addition, the AP may first transmit an operating band negotiation request, thereby adjusting the band of the antenna/RF chain of the receiving STA.

Hereinafter, the foregoing embodiments will be described with reference to FIG. 14 to FIG. 27.

Figure 28:
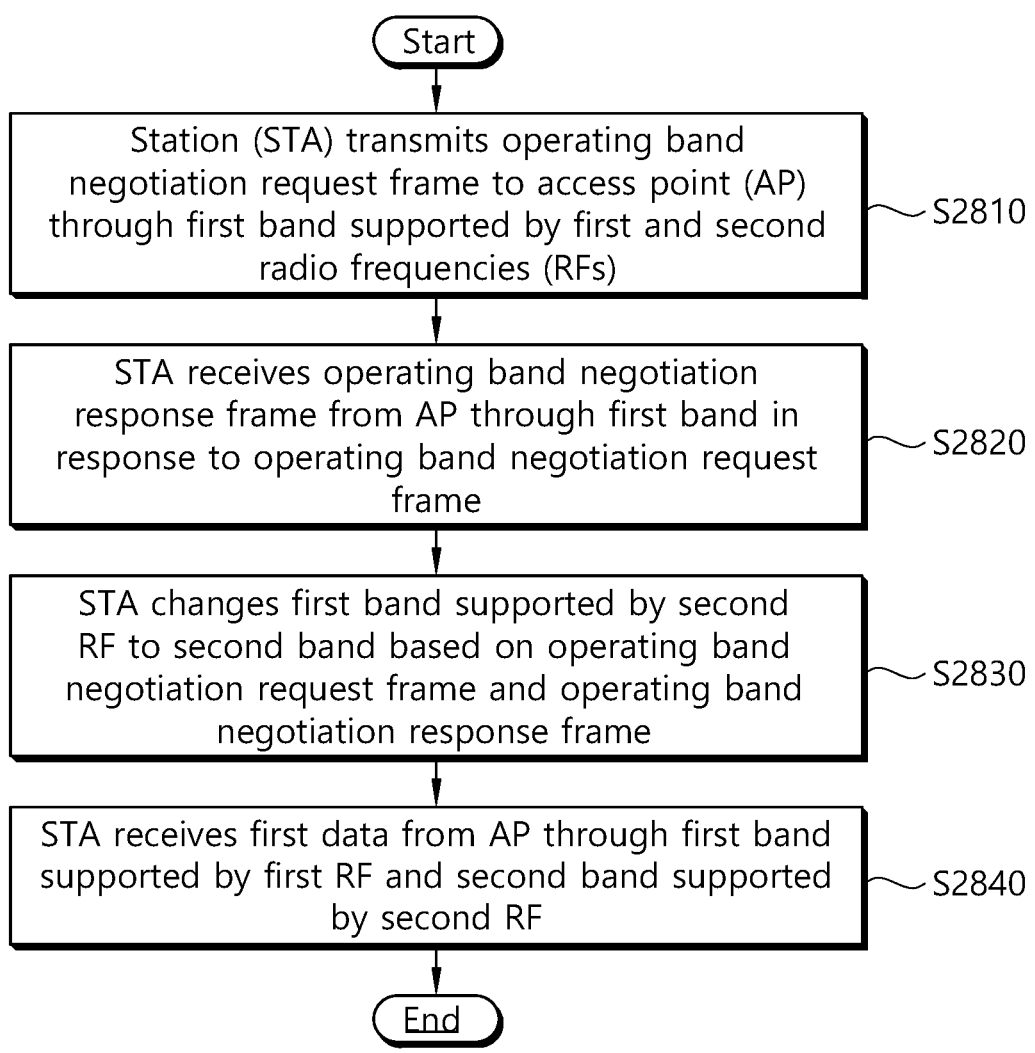
FIG. 28 is a flowchart illustrating a procedure in which an AP transmits data according to an embodiment.

FIG. 28 is a flowchart illustrating a procedure in which a STA receives data according to an embodiment.

The embodiment of FIG. 28 may be performed in a network environment supporting a next-generation WLAN system. The next-generation WLAN system may be a WLAN system evolving from an 802.11ax system and may satisfy backward compatibility with the 802.11ax system. The next-generation WLAN system may correspond to an extremely high throughput (EHT) WLAN system or an 802.11be WLAN system.

The embodiment proposes a method for transmitting data through a multi-band by changing at least one antenna or RF chain to a different band in a next-generation WLAN, such as an EHT WLAN system.

The embodiment may be performed by a station (STA), and the STA may correspond to a STA supporting an EHT WLAN system. An access point (AP) of the embodiment and the STA may support a multi-band (or multi-link).

In operation S2810, the STA transmits an operating band negotiation request frame to the AP through a first band supported by first and second radio frequencies (RFs).

In operation S2820, the STA receives an operating band negotiation response frame from the AP through the first band in response to the operating band negotiation request frame.

In operation S2830, the STA changes the first band supported by the second RF to a second band based on the operating band negotiation request frame and the operating band negotiation response frame.

That is, the STA may notify the AP that the STA desires to change a band supported by at least one RF through the operating band negotiation request frame. The AP may notify the STA that the band supported by the at least one RF can be changed through the operating band negotiation response frame. Accordingly, the STA can change the band supported by the specific RF through an operating band negotiation process with the AP.

In this embodiment, it is assumed that the STA and the AP have the first and second RFs. Since the first and second RFs support the first band before the operating band negotiation process is performed, the STA and the AP can transmit data only through the first band. However, after the operating band negotiation request frame and the operating band negotiation response frame are exchanged, the first RF still supports the first band, while the second RF supports the second band changed from the first band.

In the next-generation WLAN system, the first and second RFs can change a band and may thus be referred to as switchable RFs. That is, a band supported by the first RF may also be changed after the operating band negotiation process is performed. However, the embodiment is limited to a case where only a band supported by the second RF is changed.

In operation S2840, the STA receives first data from the AP through the first band supported by the first RF and the second band supported by the second RF. Here, the first data is transmitted through a multi-band into which the first band and the second band aggregated. That is, the AP may update information on the STA, and the STA may change a band for the second RF based on the updated information and may then receive the data through the multi-band.

The first band includes a first primary channel, and the second band includes a second primary channel.

When the multi-band includes only the two bands which are aggregated, the first band may be a 2.4 GHz or 5 GHz band, and the second band may be a 6 GHz band. When the multi-band further include a third band, the first band may be a 2.4 GHz band, the second band may be a 5 GHz band, and the third band may be a 6 GHz band. The foregoing configurations of the bands are provided only for illustration, and the WLAN system may support various numbers of bands and channels.

To perform the operating band negotiation process, the AP needs to know that the STA and the AP support the multi-band and that the STA has a switchable RF. The STA may exchange information on an antenna or RF chain in a process of association with the AP.

Specifically, the STA may transmit an association request frame to the AP through the first band. The STA may receive an association response frame from the AP through the first band in response to the association request frame.

The association request frame and the association response frame may include first information and second information. The first information may be information on the number of antennas of the first and second RFs or the number of RF chains. The second information may be information on that the first and second RFs can support both the first band and the second band. Accordingly, the STA may exchange information on the antenna or RF chain in the process of association with the AP.

The operating band negotiation request frame may include a Receiver Address (RA) field, a Transmitter Address (TA) field, and a Frame Body field.

The RA field may include an address of the AP, and the TA field may include an address of the STA.

The Frame Body field may include a Capability Information field, an Operating Class field, a Channel Number field, and a Number of Spatial Streams (NSS) field.

The Capability Information field may include information on whether the first and second RFs support both the first band and the second band. The Operating Class field may include operating class information on the second band. The Channel Number field may include operating channel information on the second band. The NSS field may include information on the second band and information on the number of spatial streams to be used for a channel in the second band.

The STA may indicate the number of RFs of which a band is desired to be changed based on the NSS field. That is, the STA may notify the AP of some switchable RFs of which a supported band is changed based on the NSS field.

The operating band negotiation response frame may include an RA field, a TA field, and a Frame Body field.

The Frame Body field may include a Basic Service Set Identifier (BSSID) field, a Beacon Interval field, and an Enhanced Distributed Coordination Access (EDCA) Interval field.

The BSSID field may include information on an identifier of a BSS configured for the second band. The Beacon Interval field may include information on a beacon interval configured for the channel in the second band. The EDCA Interval field may include time information on an EDCA or scheduling access interval in the channel in the second band.

An operation before performing the operating band negotiation process is as follows.

The STA may receive second data from the AP through the first band. The second data may be transmitted by the first and second RFs before the operating band negotiation request frame is transmitted.

That is, the first and second RFs transmit data through the first band before the operating band negotiation process is performed. However, after the operating band negotiation process is performed, the band supported by the second RF is changed to the second band, and accordingly data may be transmitted though the multi-band.

Hereinafter, a signaling method for multi-band aggregation is described. In this embodiment, configuration information on a multi-band is described as being received, and signaling may be performed by employing an FST setup method.

A transmission device and a reception device to be described below may correspond to the AP or the STA described above. The transmission device may transmit a multi-band setup request frame to the reception device. The transmission device may receive a multi-band setup response frame from the reception device.

The transmission device may transmit a multi-band ACK request frame to the reception device. The transmission device may receive a multi-band ACK response frame from the reception device.

The transmission device may include a first station management entity (SME), a first MAC layer management entity (MLME), and a second MLME. The reception device may include a second SME, a third MLME, and a fourth MLME.

The first MLME and the third MLME may be entities supporting the first band, and the second MLME and the fourth MLME may be entities supporting the second band.

The multi-band setup request frame and the multi-band setup response frame may be transmitted and received between the first MLME and the third MLME. The multi-band ACK request frame and the multi-band ACK response frame may be transmitted and received between the second MLME and the fourth MLME.

The first and the second SMEs may generate a primitive including a multi-band parameter. The multi-band parameter may include a channel number designated in the multi-band, an operating class, and a band identifier (ID). The primitive may be transmitted to the first to fourth MLMEs.

When the FST setup method is employed for the multi-band aggregation, the FST setup method includes four states and a rule for a method of transitioning one state to a next state. The four states are Initial, Setup Completed, Transition Done, and Transition Confirmed In the Initial state, the transmission device and the reception device communicate in an old band/channel. Here, when an FST setup request frame an FST setup response frame are transmitted and received between the transmission device and the reception device, the transmission device and the reception device transition to the Setup Completed state and are ready to change the currently operating band/channel(s). An FST session may be entirely or partially transferred to another band/channel.

When an LLT value included in the FST setup request frame is 0, the transmission device and the reception device transition from the Setup Completed state to the Transition Done state and are allowed to operate in different bands/channels.

Both the transmission device and the reception device need to succeed in communication in a new band/channel to reach the Transition Confirmed state. Here, when an FST ACK request frame and an FST ACK response frame are transmitted and received between the transmission device and the reception device, the transmission device and the reception device transition to the Transition Confirmed state and establish a complete connection in the new band/channel.

Figure 29:
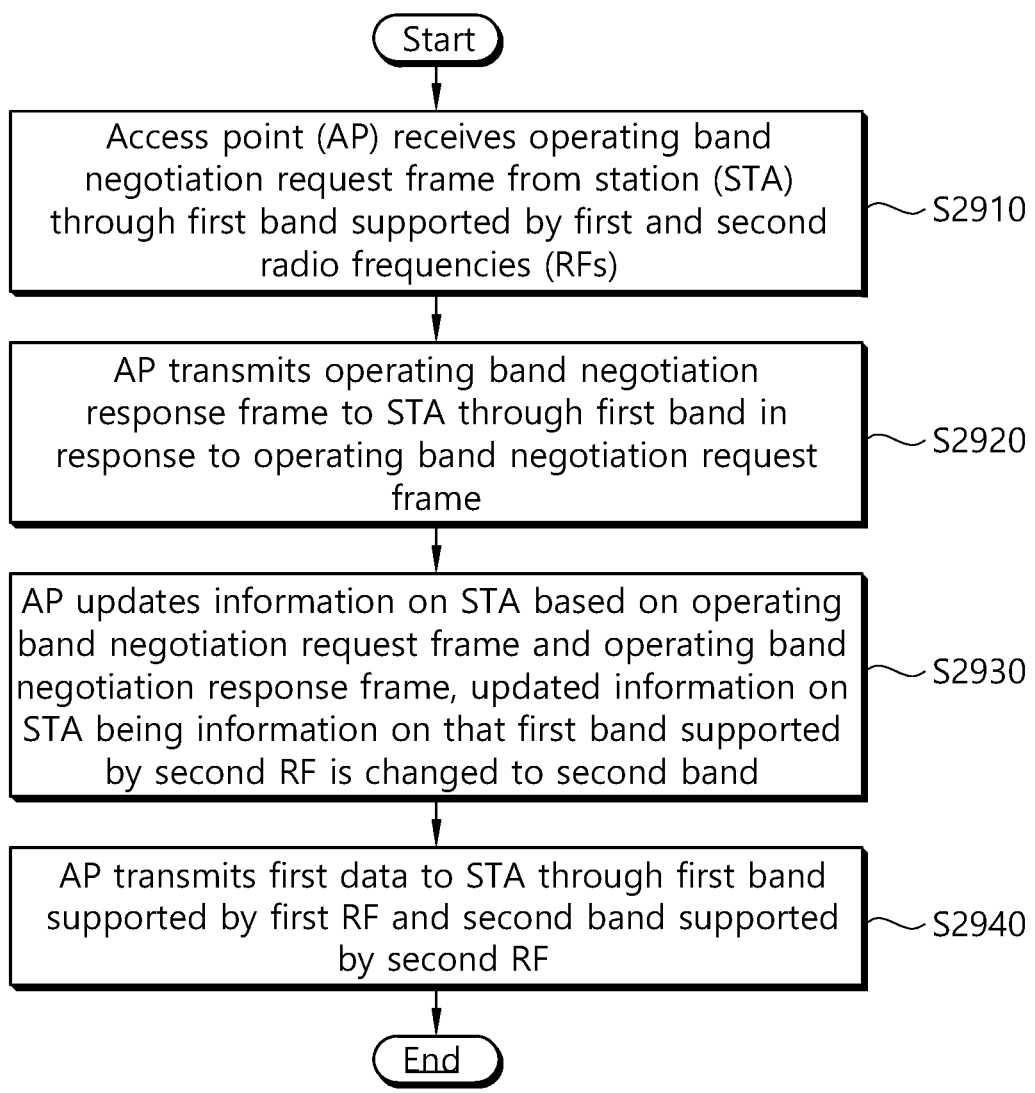
FIG. 29 is a flowchart illustrating a procedure in which a STA receives data according to an embodiment.

FIG. 29 is a flowchart illustrating a procedure in which an AP transmits data according to an embodiment.

The embodiment of FIG. 29 may be performed in a network environment supporting a next-generation WLAN system. The next-generation WLAN system may be a WLAN system evolving from an 802.11ax system and may satisfy backward compatibility with the 802.11ax system. The next-generation WLAN system may correspond to an extremely high throughput (EHT) WLAN system or an 802.11be WLAN system.

The embodiment proposes a method for transmitting data through a multi-band by changing at least one antenna or RF chain to a different band in a next-generation WLAN, such as an EHT WLAN system.

The embodiment may be performed by an AP, and a STA of the embodiment may correspond to a STA supporting an EHT WLAN system. An AP and the STA may support a multi-band (or multi-link).

In operation S2910, the AP receives an operating band negotiation request frame from the STA through a first band supported by first and second radio frequencies (RFs).

In operation S2920, the AP transmits an operating band negotiation response frame to the STA through the first band in response to the operating band negotiation request frame.

In operation S2930, the AP updates information on the STA based on the operating band negotiation request frame and the operating band negotiation response frame. The updated information on the STA is information on that the first band supported by the second RF is changed to a second band.

That is, the STA may notify the AP that the STA desires to change a band supported by at least one RF through the operating band negotiation request frame. The AP may notify the STA that the band supported by the at least one RF can be changed through the operating band negotiation response frame. Accordingly, the STA can change the band supported by the specific RF through an operating band negotiation process with the AP.

In this embodiment, it is assumed that the STA and the AP have the first and second RFs. Since the first and second RFs support the first band before the operating band negotiation process is performed, the STA and the AP can transmit data only through the first band. However, after the operating band negotiation request frame and the operating band negotiation response frame are exchanged, the first RF still supports the first band, while the second RF supports the second band changed from the first band.

In the next-generation WLAN system, the first and second RFs can change a band and may thus be referred to as switchable RFs. That is, a band supported by the first RF may also be changed after the operating band negotiation process is performed. However, the embodiment is limited to a case where only a band supported by the second RF is changed.

In operation S2940, the AP transmits first data to the STA through the first band supported by the first RF and the second band supported by the second RF. Here, the first data is transmitted through a multi-band into which the first band and the second band aggregated. That is, the AP may update information on the STA, and the STA may change a band for the second RF based on the updated information and may then receive the data through the multi-band.

The first band includes a first primary channel, and the second band includes a second primary channel.

When the multi-band includes only the two bands which are aggregated, the first band may be a 2.4 GHz or 5 GHz band, and the second band may be a 6 GHz band. When the multi-band further include a third band, the first band may be a 2.4 GHz band, the second band may be a 5 GHz band, and the third band may be a 6 GHz band. The foregoing configurations of the bands are provided only for illustration, and the WLAN system may support various numbers of bands and channels.

To perform the operating band negotiation process, the AP needs to know that the STA and the AP support the multi-band and that the STA has a switchable RF. The STA may exchange information on an antenna or RF chain in a process of association with the AP.

Specifically, the STA may transmit an association request frame to the AP through the first band. The STA may receive an association response frame from the AP through the first band in response to the association request frame.

The association request frame and the association response frame may include first information and second information. The first information may be information on the number of antennas of the first and second RFs or the number of RF chains. The second information may be information on that the first and second RFs can support both the first band and the second band. Accordingly, the STA may exchange information on the antenna or RF chain in the process of association with the AP.

The operating band negotiation request frame may include a Receiver Address (RA) field, a Transmitter Address (TA) field, and a Frame Body field.

The RA field may include an address of the AP, and the TA field may include an address of the STA.

The Frame Body field may include a Capability Information field, an Operating Class field, a Channel Number field, and a Number of Spatial Streams (NSS) field.

The Capability Information field may include information on whether the first and second RFs support both the first band and the second band. The Operating Class field may include operating class information on the second band. The Channel Number field may include operating channel information on the second band. The NSS field may include information on the second band and information on the number of spatial streams to be used for a channel in the second band.

The STA may indicate the number of RFs of which a band is desired to be changed based on the NSS field. That is, the STA may notify the AP of some switchable RFs of which a supported band is changed based on the NSS field.

The operating band negotiation response frame may include an RA field, a TA field, and a Frame Body field.

The Frame Body field may include a Basic Service Set Identifier (BSSID) field, a Beacon Interval field, and an Enhanced Distributed Coordination Access (EDCA) Interval field.

The BSSID field may include information on an identifier of a BSS configured for the second band. The Beacon Interval field may include information on a beacon interval configured for the channel in the second band. The EDCA Interval field may include time information on an EDCA or scheduling access interval in the channel in the second band.

An operation before performing the operating band negotiation process is as follows.

The STA may receive second data from the AP through the first band. The second data may be transmitted by the first and second RFs before the operating band negotiation request frame is transmitted.

That is, the first and second RFs transmit data through the first band before the operating band negotiation process is performed. However, after the operating band negotiation process is performed, the band supported by the second RF is changed to the second band, and accordingly data may be transmitted though the multi-band.

Hereinafter, a signaling method for multi-band aggregation is described. In this embodiment, configuration information on a multi-band is described as being received, and signaling may be performed by employing an FST setup method.

A transmission device and a reception device to be described below may correspond to the AP or the STA described above. The transmission device may transmit a multi-band setup request frame to the reception device. The transmission device may receive a multi-band setup response frame from the reception device.

The transmission device may transmit a multi-band ACK request frame to the reception device. The transmission device may receive a multi-band ACK response frame from the reception device.

The transmission device may include a first station management entity (SME), a first MAC layer management entity (MLME), and a second MLME. The reception device may include a second SME, a third MLME, and a fourth MLME.

The first MLME and the third MLME may be entities supporting the first band, and the second MLME and the fourth MLME may be entities supporting the second band.

The multi-band setup request frame and the multi-band setup response frame may be transmitted and received between the first MLME and the third MLME. The multi-band ACK request frame and the multi-band ACK response frame may be transmitted and received between the second MLME and the fourth MLME.

The first and the second SMEs may generate a primitive including a multi-band parameter. The multi-band parameter may include a channel number designated in the multi-band, an operating class, and a band identifier (ID). The primitive may be transmitted to the first to fourth MLMEs.

When the FST setup method is employed for the multi-band aggregation, the FST setup method includes four states and a rule for a method of transitioning one state to a next state. The four states are Initial, Setup Completed, Transition Done, and Transition Confirmed states.

In the Initial state, the transmission device and the reception device communicate in an old band/channel. Here, when an FST setup request frame an FST setup response frame are transmitted and received between the transmission device and the reception device, the transmission device and the reception device transition to the Setup Completed state and are ready to change the currently operating band/channel(s). An FST session may be entirely or partially transferred to another band/channel.

When an LLT value included in the FST setup request frame is 0, the transmission device and the reception device transition from the Setup Completed state to the Transition Done state and are allowed to operate in different bands/channels.

Both the transmission device and the reception device need to succeed in communication in a new band/channel to reach the Transition Confirmed state. Here, when an FST ACK request frame and an FST ACK response frame are transmitted and received between the transmission device and the reception device, the transmission device and the reception device transition to the Transition Confirmed state and establish a complete connection in the new band/channel.

6. Device Configuration

Figure 30:
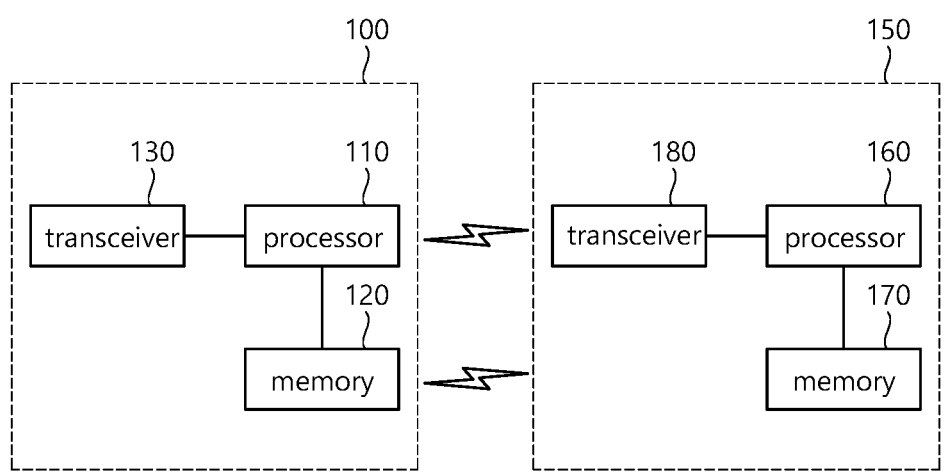
FIG. 30 is a diagram illustrating a device for implementing the aforementioned method.

FIG. 30 is a diagram illustrating a device for implementing the aforementioned method.

A wireless device (100) of FIG. 30 may be a transmission device capable of implementing the foregoing embodiments and may operate as an AP STA. A wireless device (150) of FIG. 30 may be a reception device capable of implementing the foregoing embodiments and may operate as a non-AP STA.

The transmission device (100) may include a processor (110), a memory (120), and a transceiver (130), and the reception device (150) may include a processor (160), a memory (170), and a transceiver (180). The transceiver (130, 180) transmits/receives a radio signal and may be operated in a physical layer of IEEE 802.11/3GPP, and so on. The processor (110, 160) may be operated in the physical layer and/or MAC layer and may be operatively connected to the transceiver (130, 180).

The processor (110, 160) and/or the transceiver (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement the functions, processes and/or methods proposed in the present disclosure. For example, the processor (110, 160) may perform the operation according to the present embodiment.

A specific operation of the processor 110 of the transmission device is as follows. The processor 110 of the transmission device transmits an operating band negotiation request frame to an AP through a first band supported by first and second RFs, receives an operating band negotiation response frame from the AP through the first band in response to the operating band negotiation request frame, changes the first band supported by the second RF to a second band based on the operating band negotiation request frame and the operating band negotiation response frame, and receives first data from the AP through the first band supported by the first RF and the second band supported by the second RF.

A specific operation of the processor 160 of the reception device is as follows. The processor 160 of the reception device receives an operating band negotiation request frame from a STA through a first band supported by first and second RFs, transmits an operating band negotiation response frame to the STA through the first band in response to the operating band negotiation request frame, updates information on the STA, which indicates that the first band supported by the second RF is changed to a second band, based on the operating band negotiation request frame and the operating band negotiation response frame, and transmits first data to the STA through the first band supported by the first RF and the second band supported by the second RF.

Figure 31:
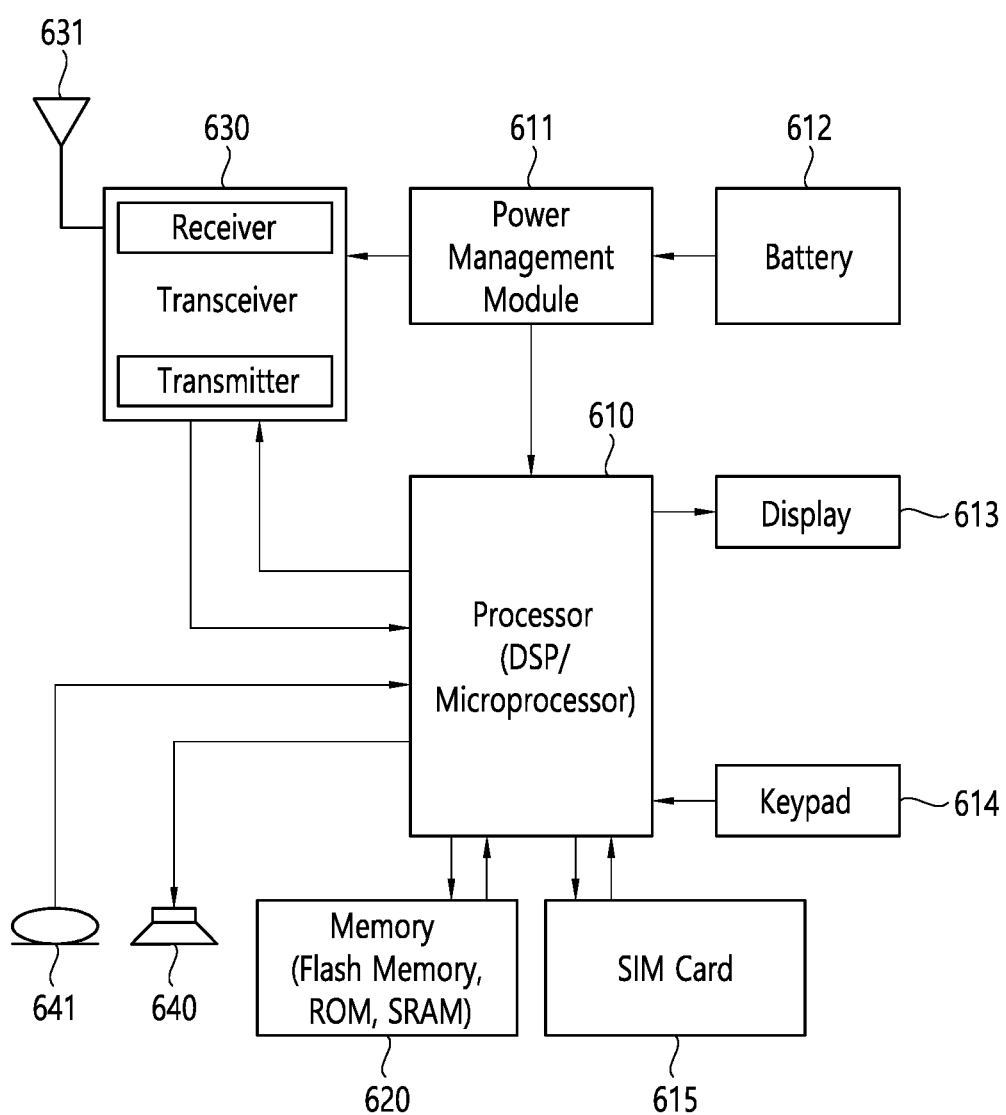
FIG. 31 illustrates a specific wireless device for implementing an embodiment of the present disclosure.

FIG. 31 illustrates a specific wireless device for implementing an embodiment of the present disclosure. The present disclosure described above with respect to a transmission device or a reception device may be applied to this embodiment.

A wireless device includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures, and/or methods described in the present disclosure. Layers of the radio interface protocol may be implemented in the processor 610. The processor 610 may include application-specific integrated circuit (ASIC), other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In a transmission device, the processor 610 transmits an operating band negotiation request frame to an AP through a first band supported by first and second RFs, receives an operating band negotiation response frame from the AP through the first band in response to the operating band negotiation request frame, changes the first band supported by the second RF to a second band based on the operating band negotiation request frame and the operating band negotiation response frame, and receives first data from the AP through the first band supported by the first RF and the second band supported by the second RF.

In a reception device, the processor 610 receives an operating band negotiation request frame from a STA through a first band supported by first and second RFs, transmits an operating band negotiation response frame to the STA through the first band in response to the operating band negotiation request frame, updates information on the STA, which indicates that the first band supported by the second RF is changed to a second band, based on the operating band negotiation request frame and the operating band negotiation response frame, and transmits first data to the STA through the first band supported by the first RF and the second band supported by the second RF.

That is, the STA may notify the AP that the STA desires to change a band supported by at least one RF through the operating band negotiation request frame. The AP may notify the STA that the band supported by the at least one RF can be changed through the operating band negotiation response frame. Accordingly, the STA can change the band supported by the specific RF through an operating band negotiation process with the AP.

In this embodiment, it is assumed that the STA and the AP have the first and second RFs. Since the first and second RFs support the first band before the operating band negotiation process is performed, the STA and the AP can transmit data only through the first band. However, after the operating band negotiation request frame and the operating band negotiation response frame are exchanged, the first RF still supports the first band, while the second RF supports the second band changed from the first band.

In the next-generation WLAN system, the first and second RFs can change a band and may thus be referred to as switchable RFs. That is, a band supported by the first RF may also be changed after the operating band negotiation process is performed. However, the embodiment is limited to a case where only a band supported by the second RF is changed.

The first data is transmitted through a multi-band into which the first band and the second band aggregated. That is, the AP may update information on the STA, and the STA may change a band for the second RF based on the updated information and may then receive the data through the multi-band.

The first band includes a first primary channel, and the second band includes a second primary channel.

When the multi-band includes only the two bands which are aggregated, the first band may be a 2.4 GHz or 5 GHz band, and the second band may be a 6 GHz band. When the multi-band further include a third band, the first band may be a 2.4 GHz band, the second band may be a 5 GHz band, and the third band may be a 6 GHz band. The foregoing configurations of the bands are provided only for illustration, and the WLAN system may support various numbers of bands and channels.

To perform the operating band negotiation process, the AP needs to know that the STA and the AP support the multi-band and that the STA has a switchable RF. The STA may exchange information on an antenna or RF chain in a process of association with the AP.

Specifically, the STA may transmit an association request frame to the AP through the first band. The STA may receive an association response frame from the AP through the first band in response to the association request frame.

The association request frame and the association response frame may include first information and second information. The first information may be information on the number of antennas of the first and second RFs or the number of RF chains. The second information may be information on that the first and second RFs can support both the first band and the second band. Accordingly, the STA may exchange information on the antenna or RF chain in the process of association with the AP.

The operating band negotiation request frame may include a Receiver Address (RA) field, a Transmitter Address (TA) field, and a Frame Body field.

The RA field may include an address of the AP, and the TA field may include an address of the STA.

The Frame Body field may include a Capability Information field, an Operating Class field, a Channel Number field, and a Number of Spatial Streams (NSS) field.

The Capability Information field may include information on whether the first and second RFs support both the first band and the second band. The Operating Class field may include operating class information on the second band. The Channel Number field may include operating channel information on the second band. The NSS field may include information on the second band and information on the number of spatial streams to be used for a channel in the second band.

The STA may indicate the number of RFs of which a band is desired to be changed based on the NSS field. That is, the STA may notify the AP of some switchable RFs of which a supported band is changed based on the NSS field.

The operating band negotiation response frame may include an RA field, a TA field, and a Frame Body field.

The Frame Body field may include a Basic Service Set Identifier (BSSID) field, a Beacon Interval field, and an Enhanced Distributed Coordination Access (EDCA) Interval field.

The BSSID field may include information on an identifier of a BSS configured for the second band. The Beacon Interval field may include information on a beacon interval configured for the channel in the second band. The EDCA Interval field may include time information on an EDCA or scheduling access interval in the channel in the second band.

An operation before performing the operating band negotiation process is as follows.

The STA may receive second data from the AP through the first band. The second data may be transmitted by the first and second RFs before the operating band negotiation request frame is transmitted.

That is, the first and second RFs transmit data through the first band before the operating band negotiation process is performed. However, after the operating band negotiation process is performed, the band supported by the second RF is changed to the second band, and accordingly data may be transmitted though the multi-band.

Hereinafter, a signaling method for multi-band aggregation is described. In this embodiment, configuration information on a multi-band is described as being received, and signaling may be performed by employing an FST setup method.

A transmission device and a reception device to be described below may correspond to the AP or the STA described above. The transmission device may transmit a multi-band setup request frame to the reception device. The transmission device may receive a multi-band setup response frame from the reception device.

The transmission device may transmit a multi-band ACK request frame to the reception device. The transmission device may receive a multi-band ACK response frame from the reception device.

The transmission device may include a first station management entity (SME), a first MAC layer management entity (MLME), and a second MLME. The reception device may include a second SME, a third MLME, and a fourth MLME.

The first MLME and the third MLME may be entities supporting the first band, and the second MLME and the fourth MLME may be entities supporting the second band.

The multi-band setup request frame and the multi-band setup response frame may be transmitted and received between the first MLME and the third MLME. The multi-band ACK request frame and the multi-band ACK response frame may be transmitted and received between the second MLME and the fourth MLME.

The first and the second SMEs may generate a primitive including a multi-band parameter. The multi-band parameter may include a channel number designated in the multi-band, an operating class, and a band identifier (ID). The primitive may be transmitted to the first to fourth MLMEs.

When the FST setup method is employed for the multi-band aggregation, the FST setup method includes four states and a rule for a method of transitioning one state to a next state. The four states are Initial, Setup Completed, Transition Done, and Transition Confirmed states.

In the Initial state, the transmission device and the reception device communicate in an old band/channel. Here, when an FST setup request frame an FST setup response frame are transmitted and received between the transmission device and the reception device, the transmission device and the reception device transition to the Setup Completed state and are ready to change the currently operating band/channel(s). An FST session may be entirely or partially transferred to another band/channel.

When an LLT value included in the FST setup request frame is 0, the transmission device and the reception device transition from the Setup Completed state to the Transition Done state and are allowed to operate in different bands/channels.

Both the transmission device and the reception device need to succeed in communication in a new band/channel to reach the Transition Confirmed state. Here, when an FST ACK request frame and an FST ACK response frame are transmitted and received between the transmission device and the reception device, the transmission device and the reception device transition to the Transition Confirmed state and establish a complete connection in the new band/channel.

What is claimed is:

1. A method in a wireless local area network (WLAN) system, the method comprising:
   transmitting, by a non-access point (AP) station (STA), an Operating Mode Notification frame to an access point (AP) through a first link;
   supporting, by the non-AP STA, a multi-link on a second link based on the Operating Mode Notification frame; and
   indicating, by the non-AP STA, a number of spatial streams that support for reception and transmission on the second link after transmission of the Operating Mode Notification frame.

2. The method of claim 1, further comprising:
   exchanging, by the non-AP STA, an association frame with the AP through the first link.

3. The method of claim 1, wherein the Operating Mode Notification frame comprises an operating link negotiation request frame or an operating link negotiation response frame,
   wherein the operating link negotiation request frame comprises a Receiver Address (RA) field, a Transmitter Address (TA) field, and a Frame Body field,
   the RA field comprises an address of the AP, and
   the TA field comprises an address of the non-AP STA.

4. The method of claim 3, wherein the Frame Body field comprises an Operating Class field, a Channel Number field, and a Number of Spatial Streams (NSS) field,
   the Operating Class field comprises operating class information on the second link,
   the Channel Number field comprises operating channel information on the second link, and
   the NSS field comprises information on the second link and information on the number of the spatial streams to be used for a channel in the second link.

5. The method of claim 3, wherein the operating link negotiation response frame comprises an RA field, a TA field, and a Frame Body field, the Frame Body field comprises a Basic Service Set Identifier (BSSID) field, a Beacon Interval field, and an Enhanced Distributed Coordination Access (EDCA) Interval field, the BSSID field comprises information on an identifier of a BSS configured for the second link, the Beacon Interval field comprises information on a beacon interval configured for a channel in the second link, and the EDCA Interval field comprises time information on an EDCA or scheduling access interval in the channel in the second link.

6. The method of claim 1, further comprising:
receiving, by the non-AP STA, data from the AP through the second link.

7. The method of claim 1, wherein the first link is in a 5 GHz band, and the second link is in a 6 GHz band.

8. A non-access point (AP) station (STA) in a wireless local area network (WLAN) system, the non-AP STA comprising:
a memory;
a transceiver; and
a processor operatively coupled with the memory and the transceiver,
wherein the processor is configured to:
transmit an Operating Mode Notification frame to an access point (AP) through a first link;
support a multi-link on a second link based on the Operating Mode Notification frame; and
indicate a number of spatial streams that support for reception and transmission on the second link after transmission of the Operating Mode Notification frame.

9. The non-AP STA of claim 8, wherein the processor is further configured to:
exchange an association frame with the AP through the first link.

10. The non-AP STA of claim 8, wherein the Operating Mode Notification frame comprises an operating link negotiation request frame or an operating link negotiation response frame,
wherein the operating link negotiation request frame comprises a Receiver Address (RA) field, a Transmitter Address (TA) field, and a Frame Body field,
the RA field comprises an address of the AP, and
the TA field comprises an address of the non-AP STA.

11. The non-AP STA of claim 10, wherein the Frame Body field comprises an Operating Class field, a Channel Number field, and a Number of Spatial Streams (NSS) field,
the Operating Class field comprises operating class information on the second link,
the Channel Number field comprises operating channel information on the second link, and
the NSS field comprises information on the second link and information on the number of the spatial streams to be used for a channel in the second link.

12. The non-AP STA of claim 10, wherein the operating link negotiation response frame comprises an RA field, a TA field, and a Frame Body field,
the Frame Body field comprises a Basic Service Set Identifier (BSSID) field, a Beacon Interval field, and an Enhanced Distributed Coordination Access (EDCA) Interval field,
the BSSID field comprises information on an identifier of a BSS configured for the second link,
the Beacon Interval field comprises information on a beacon interval configured for a channel in the second link, and
the EDCA Interval field comprises time information on an EDCA or scheduling access interval in the channel in the second link.

13. The non-AP STA of claim 8, wherein the processor is further configured to receive data from the AP through the second link.

14. The non-AP STA of claim 8, wherein the first link is in a 5 GHz band, and the second link is in a 6 GHz band.

15. A method in a wireless local area network (WLAN) system, the method comprising:
receiving, by an access point (AP), an Operating Mode Notification frame from a non-access point (AP) station (STA) through a first link;
supporting, by the AP, a multi-link on a second link based on the Operating Mode Notification frame; and
indicating, by the AP, a number of spatial streams that support for reception and transmission on the second link after reception of the Operating Mode Notification frame.

* * * * *